(12) United States Patent
Furuichi et al.

(10) Patent No.: US 9,568,865 B2
(45) Date of Patent: Feb. 14, 2017

(54) BELT DEVICE, FIXING DEVICE, AND IMAGE FORMING APPARATUS

(71) Applicants: Yuusuke Furuichi, Kanagawa (JP); Yoshihiro Fukuhata, Hyogo (JP); Tomohiko Fujii, Tokyo (JP)

(72) Inventors: Yuusuke Furuichi, Kanagawa (JP); Yoshihiro Fukuhata, Hyogo (JP); Tomohiko Fujii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/818,466

(22) Filed: Aug. 5, 2015

(65) Prior Publication Data
US 2016/0098000 A1    Apr. 7, 2016

(30) Foreign Application Priority Data

Oct. 2, 2014 (JP) .................................. 2014-203850

(51) Int. Cl.
*G03G 15/20* (2006.01)
*F16H 7/02* (2006.01)
(Continued)

(52) U.S. Cl.
CPC ............ *G03G 15/2032* (2013.01); *F16H 7/02* (2013.01); *F16H 7/08* (2013.01); *F16H 7/18* (2013.01);
(Continued)

(58) Field of Classification Search
CPC ............ G03G 15/2017; G03G 15/2032; G03G 15/2053; G03G 15/2067; G03G 2215/2038
See application file for complete search history.

(56) References Cited

U.S. PATENT DOCUMENTS 6,078,780 A * 6/2000 Abe .................. G03G 15/2053
                                                    219/216
2002/0051659 A1 * 5/2002 Baba .................. G03G 15/161
                                                    399/307
(Continued)

FOREIGN PATENT DOCUMENTS

JP        2002-207389        7/2002
JP        2007-057927        3/2007

OTHER PUBLICATIONS

U.S. Appl. No. 14/806,555, filed Jul. 22, 2015.

*Primary Examiner* — David Gray
*Assistant Examiner* — Carla Therrien
(74) *Attorney, Agent, or Firm* — Oblon, McClelland, Maier & Neustadt, L.L.P.

(57) ABSTRACT

A belt device includes an endless belt and a rotary driver contacting an outer circumferential surface of the belt to drive and rotate the belt. An opposed belt support is disposed opposite the rotary driver and in contact with an inner circumferential surface of the belt. A rotary belt support is disposed opposite the rotary driver via the opposed belt support and in contact with the inner circumferential surface of the belt. A belt support holder holds the opposed belt support and the rotary belt support to retain a predetermined interval between the opposed belt support and the rotary belt support. A biasing assembly presses against the belt support holder to move the opposed belt support and the rotary belt support collectively with respect to the rotary driver and bias the opposed belt support against the rotary driver.

13 Claims, 13 Drawing Sheets

(51) Int. Cl.
*F16H 7/18* (2006.01)
*F16H 7/08* (2006.01)

(52) U.S. Cl.
CPC ..... *G03G 15/2053* (2013.01); *F16H 2007/185* (2013.01); *G03G 2215/2038* (2013.01)

(56) References Cited

U.S. PATENT DOCUMENTS

| | | | |
|---|---|---|---|
| 2004/0184851 A1* | 9/2004 | Otsuka | G03G 15/2053 399/329 |
| 2005/0117943 A1* | 6/2005 | Nakafuji | G03G 15/2064 399/328 |
| 2006/0127142 A1* | 6/2006 | Nakamoto | G03G 15/2053 399/329 |
| 2006/0269334 A1* | 11/2006 | Takahashi | G03G 15/2064 399/329 |
| 2007/0134017 A1* | 6/2007 | Otsuka | G03G 15/205 399/69 |
| 2007/0223976 A1 | 9/2007 | Yagi et al. | |
| 2008/0013992 A1 | 1/2008 | Fukuhata et al. | |
| 2008/0013993 A1 | 1/2008 | Obata et al. | |
| 2008/0031664 A1 | 2/2008 | Yagi et al. | |
| 2008/0063442 A1 | 3/2008 | Yagi et al. | |
| 2008/0069611 A1 | 3/2008 | Obata et al. | |
| 2008/0080910 A1* | 4/2008 | Senda | G03G 15/206 399/328 |
| 2008/0304882 A1* | 12/2008 | Shin | G03G 15/2053 399/329 |
| 2010/0178089 A1 | 7/2010 | Fukuhata | |
| 2010/0239297 A1 | 9/2010 | Sakaya et al. | |
| 2010/0260524 A1 | 10/2010 | Hiraoka et al. | |
| 2011/0052285 A1 | 3/2011 | Fukuhata | |
| 2011/0311283 A1 | 12/2011 | Fukuhata | |
| 2011/0318076 A1* | 12/2011 | Tanda | G03G 15/2007 399/329 |
| 2012/0002997 A1 | 1/2012 | Hiraoka et al. | |
| 2012/0020690 A1 | 1/2012 | Yamamoto et al. | |
| 2012/0070206 A1* | 3/2012 | Tsukioka | G03G 15/2032 399/328 |
| 2012/0177422 A1 | 7/2012 | Nanno et al. | |
| 2012/0275834 A1 | 11/2012 | Naitoh et al. | |
| 2013/0064586 A1 | 3/2013 | Adachi et al. | |
| 2014/0056625 A1 | 2/2014 | Naitoh et al. | |
| 2014/0072354 A1 | 3/2014 | Toyoda et al. | |
| 2014/0072357 A1 | 3/2014 | Fukuhata et al. | |
| 2014/0093288 A1 | 4/2014 | Naitoh et al. | |
| 2014/0099146 A1 | 4/2014 | Fujii et al. | |
| 2014/0112691 A1 | 4/2014 | Nanno et al. | |
| 2014/0153982 A1 | 6/2014 | Adachi et al. | |
| 2014/0153983 A1 | 6/2014 | Fujii et al. | |
| 2015/0132026 A1 | 5/2015 | Yoshida et al. | |
| 2015/0139705 A1 | 5/2015 | Furuichi et al. | |
| 2015/0198920 A1 | 7/2015 | Fukuhata et al. | |

\* cited by examiner

BELT DEVICE, FIXING DEVICE, AND IMAGE FORMING APPARATUS

CROSS-REFERENCE TO RELATED APPLICATION

This patent application is based on and claims priority pursuant to 35 U.S.C. §119 to Japanese Patent Application No. 2014-203850, filed on Oct. 2, 2014, in the Japanese Patent Office, the entire disclosure of which is hereby incorporated by reference herein.

BACKGROUND

Technical Field

Exemplary aspects of the present disclosure relate to a belt device, a fixing device, and an image forming apparatus, and more particularly, to a belt device incorporating an endless belt, a fixing device for fixing a toner image on a recording medium, and an image forming apparatus incorporating the fixing device.

Description of the Background

Related-art image forming apparatuses, such as copiers, facsimile machines, printers, or multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such fixing device may include a belt device that includes an endless belt, such as a fixing belt and a fixing film, heated by a heater and a rotary driver, such as a pressure roller and a pressure belt, pressed against the endless belt to form a fixing nip therebetween through which a recording medium bearing a toner image is conveyed. As the recording medium bearing the toner image is conveyed through the fixing nip, the endless belt and the rotary driver apply heat and pressure to the recording medium, melting and fixing the toner image on the recording medium.

SUMMARY

This specification describes below an improved belt device. In one exemplary embodiment, the belt device includes an endless belt and a rotary driver contacting an outer circumferential surface of the belt to drive and rotate the belt. An opposed belt support is disposed opposite the rotary driver and in contact with an inner circumferential surface of the belt. A rotary belt support is disposed opposite the rotary driver via the opposed belt support and in contact with the inner circumferential surface of the belt. A belt support holder holds the opposed belt support and the rotary belt support to retain a predetermined interval between the opposed belt support and the rotary belt support. A biasing assembly presses against the belt support holder to move the opposed belt support and the rotary belt support collectively with respect to the rotary driver and bias the opposed belt support against the rotary driver.

This specification further describes an improved fixing device. In one exemplary embodiment, the fixing device includes an endless belt and a rotary driver contacting an outer circumferential surface of the belt to drive and rotate the belt. An opposed belt support is disposed opposite the rotary driver and in contact with an inner circumferential surface of the belt. A rotary belt support is disposed opposite the rotary driver via the opposed belt support and in contact with the inner circumferential surface of the belt. A heater heats the belt. A belt support holder holds the opposed belt support and the rotary belt support to retain a predetermined interval between the opposed belt support and the rotary belt support. A biasing assembly presses against the belt support holder to move the opposed belt support and the rotary belt support collectively with respect to the rotary driver and bias the opposed belt support against the rotary driver.

This specification further describes an improved image forming apparatus. In one exemplary embodiment, the image forming apparatus includes an image forming device to form a toner image and a fixing device disposed downstream from the image forming device in a recording medium conveyance direction to fix the toner image on a recording medium. The fixing device includes an endless belt and a rotary driver contacting an outer circumferential surface of the belt to drive and rotate the belt. An opposed belt support is disposed opposite the rotary driver and in contact with an inner circumferential surface of the belt. A rotary belt support is disposed opposite the rotary driver via the opposed belt support and in contact with the inner circumferential surface of the belt. A heater heats the belt. A belt support holder holds the opposed belt support and the rotary belt support to retain a predetermined interval between the opposed belt support and the rotary belt support. A biasing assembly presses against the belt support holder to move the opposed belt support and the rotary belt support collectively with respect to the rotary driver and bias the opposed belt support against the rotary driver.

BRIEF DESCRIPTION OF THE DRAWINGS

A more complete appreciation of the disclosure and the many attendant advantages thereof will be readily obtained as the same becomes better understood by reference to the following detailed description when considered in connection with the accompanying drawings, wherein.

DETAILED DESCRIPTION OF THE DISCLOSURE

Figure 1:
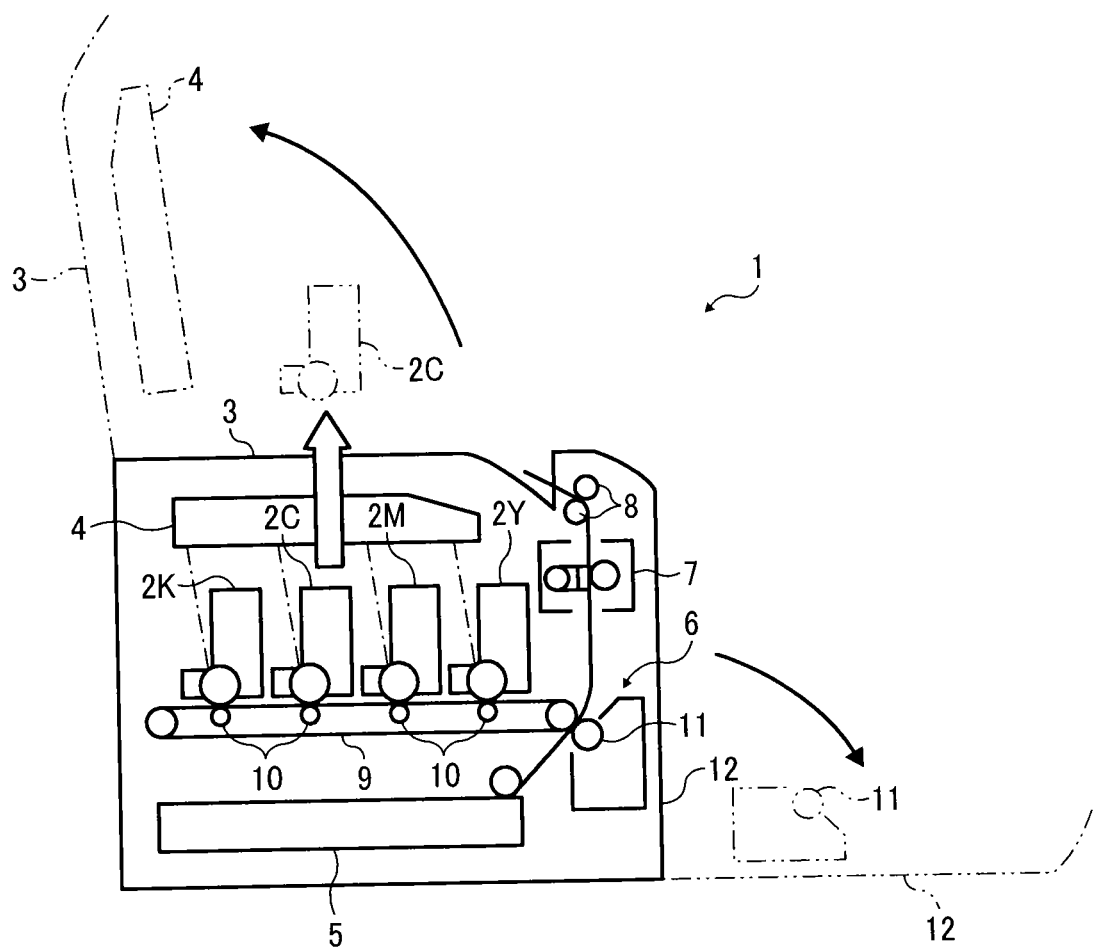
FIG. 1 is a schematic vertical sectional view of an image forming apparatus according to an exemplary embodiment of the present disclosure.

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, in particular to FIG. 1, an image forming apparatus 1 according to an exemplary embodiment of the present disclosure is explained.

It is to be noted that, in the drawings for explaining exemplary embodiments of this disclosure, identical reference numerals are assigned, as long as discrimination is possible, to components such as members and component parts having an identical function or shape, thus omitting description thereof once it is provided.

FIG. 1 is a schematic vertical sectional view of the image forming apparatus 1. The image forming apparatus 1 may be a copier, a facsimile machine, a printer, a multifunction peripheral or a multifunction printer (MFP) having at least one of copying, printing, scanning, facsimile, and plotter functions, or the like. According to this exemplary embodiment, the image forming apparatus 1 is a color printer that forms color and monochrome toner images on recording media by electrophotography. Alternatively, the image forming apparatus may be a monochrome printer that forms a monochrome toner image on a recording medium.

It is to be noted that, in the drawings for explaining exemplary embodiments of this disclosure, identical reference numerals are assigned as long as discrimination is possible to components such as members and component parts having an identical function or shape, thus omitting description thereof once it is provided.

With reference to FIG. 1, a description is provided of a construction of the image forming apparatus 1.

Four process units 2Y, 2M, 2C, and 2Y serving as an image forming device are located in a center portion of the image forming apparatus 1. Although the process units 2Y, 2M, 2C, and 2K contain developers in different colors, that is, yellow, magenta, cyan, and black corresponding to color separation components of a color image, (e.g., yellow, magenta, cyan, and black toners), respectively, they have an identical structure. For example, each of the process units 2Y, 2M, 2C, and 2K includes a photoconductor serving as an image bearer or a latent image bearer that bears an electrostatic latent image and a resultant toner image; a charging device serving as a charger that charges an outer circumferential surface of the photoconductor; a developing device that supplies the developer (e.g., toner) to the electrostatic latent image formed on the outer circumferential surface of the photoconductor, thus visualizing the electrostatic latent image as a toner image; and a cleaning device serving as a cleaner that cleans the outer circumferential surface of the photoconductor. For example, the developer includes toner containing oily silica, that is, silica containing oil, as an additive.

Each of the four process units 2Y, 2M, 2C, and 2K is removably installed in the image forming apparatus 1. As a user lifts and pivots an upper cover 3 disposed atop the image forming apparatus 1 as illustrated in a long and short dashed line in FIG. 1, the user picks up and removes each of the process units 2Y, 2M, 2C, and 2K from the image forming apparatus 1 and places and installs each of the process units 2Y, 2M, 2C, and 2K inside the image forming apparatus 1.

Above the process units 2Y, 2M, 2C, and 2K is an exposure device 4 that exposes the outer circumferential surface of the respective photoconductors with laser beams. The exposure device 4 is attached to the upper cover 3. Hence, as the user lifts the upper cover 3, the exposure device 4 is retracted from a space above the process units 2Y, 2M, 2C, and 2K together with the upper cover 3. Thus, the exposure device 4 facilitates removal and installation of the process units 2Y, 2M, 2C, and 2K.

The image forming apparatus 1 further includes a sheet feeder 5 serving as a recording medium supply that supplies a sheet serving as a recording medium to the process units 2Y, 2M, 2C, and 2K; a transfer device 6 serving as a transferor that transfers a toner image formed on the photoconductor onto the sheet; a fixing device 7 that fixes the toner image on the sheet; and an output roller pair 8 serving as a recording medium ejector that ejects the sheet bearing the fixed toner image onto an outside of the image forming apparatus 1.

For example, the transfer device 6 includes an endless intermediate transfer belt 9, four primary transfer rollers 10 serving as primary transferors, and a secondary transfer roller 11 serving as a secondary transferor. The four primary transfer rollers 10 are pressed against the four photoconductors of the four process units 2Y, 2M, 2C, and 2K, respectively, via the intermediate transfer belt 9, forming four primary transfer nips between the intermediate transfer belt 9 and the photoconductors. The secondary transfer roller 11 is pressed against one of a plurality of rollers across which the intermediate transfer belt 9 is stretched taut via the intermediate transfer belt 9, forming a secondary transfer nip between the secondary transfer roller 11 and the intermediate transfer belt 9.

The secondary transfer roller 11 is attached to a front cover 12 that is opened and closed by the user. As the user pivots and opens the front cover 12 toward the user, the secondary transfer roller 11 separates from the intermediate transfer belt 9 as illustrated in a long and short dashed line in FIG. 1. Thus, the secondary transfer roller 11 facilitates removal of the sheet jammed at the secondary transfer nip.

With reference to FIG. 1, a description is provided of an image forming operation performed by the image forming apparatus 1 having the construction described above to form a color toner image on a sheet.

As the image forming apparatus 1 receives a print job, the process units 2Y, 2M, 2C, and 2K form yellow, magenta, cyan, and black toner images, respectively. For example, in each of the process units 2Y, 2M, 2C, and 2K, the photoconductor is driven and rotated and the charging device uniformly charges the outer circumferential surface of the photoconductor at a predetermined polarity. The exposure device 4 exposes the outer circumferential surface of the photoconductor with a laser beam, forming an electrostatic latent image on the photoconductor according to monochrome image data, that is, yellow, magenta, cyan, and black image data created by decomposing desired color image data. The developing device supplies toner to the electrostatic latent image formed on the photoconductor, developing or visualizing the electrostatic latent image into a toner image, that is, yellow, magenta, cyan, and black toner images.

The yellow, magenta, cyan, and black toner images are primarily transferred from the photoconductors onto the intermediate transfer belt 9 successively at the primary transfer nips such that the yellow, magenta, cyan, and black toner images are superimposed on a same position on the intermediate transfer belt 9. The cleaning device removes residual toner failed to be transferred onto the intermediate transfer belt 9 and therefore remaining on the photoconductor therefrom. The yellow, magenta, cyan, and black toner images superimposed on the intermediate transfer belt 9 are secondarily transferred onto the sheet conveyed from the sheet feeder 5 at the secondary transfer nip collectively. Thus, a color toner image is formed on the sheet. The sheet bearing the color toner image, after passing through the secondary transfer nip, is conveyed to the fixing device 7 that fixes the color toner image on the sheet. Thereafter, the sheet bearing the fixed color toner image is ejected by the output roller pair 8 onto the outside of the image forming apparatus 1.

The above describes the image forming operation of the image forming apparatus 1 to form the color toner image, that is, a full-color toner image, on the sheet. Alternatively, the image forming apparatus 1 may form a monochrome toner image by using any one of the four process units 2Y, 2M, 2C, and 2K or may form a bicolor or tricolor toner image by using two or three of the process units 2Y, 2M, 2C, and 2K.

Figure 2:
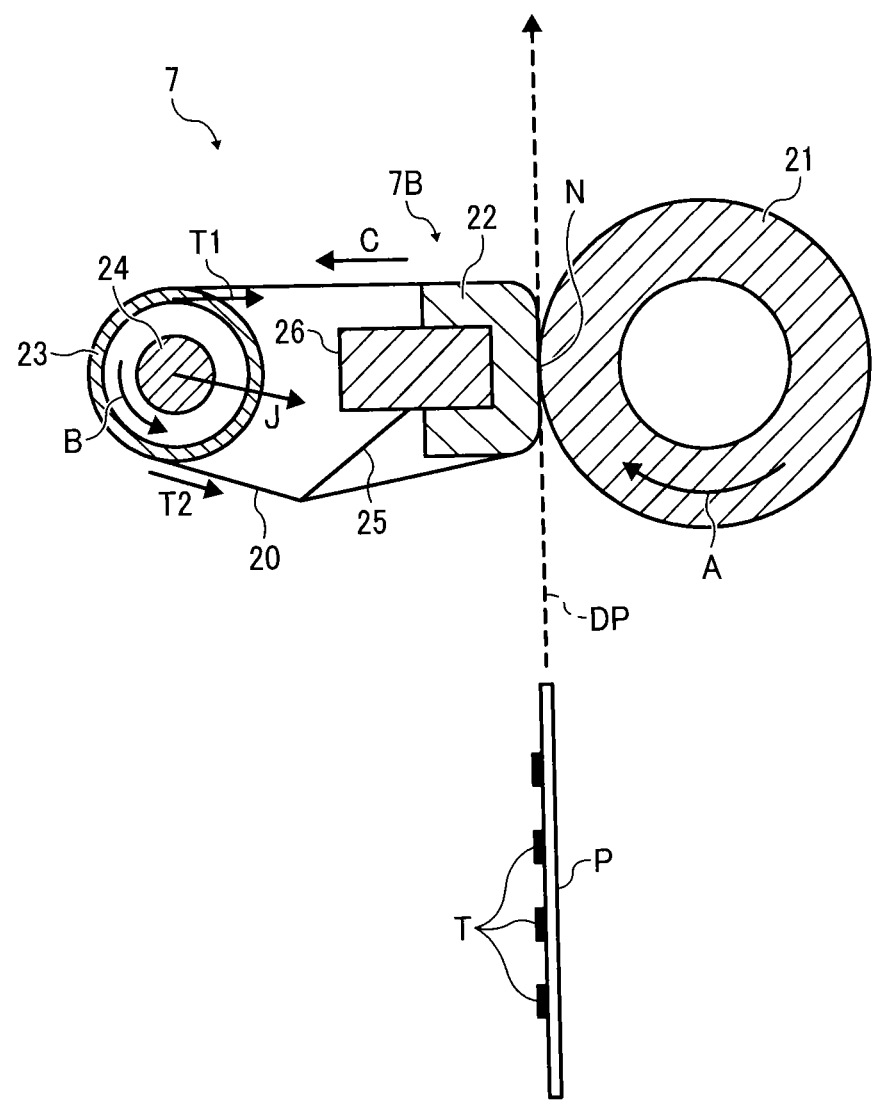
FIG. 2 is a schematic vertical sectional view of a fixing device according to a first exemplary embodiment of the present disclosure, which is installed in the image forming apparatus shown in FIG. 1.

With reference to FIG. 2, a description is provided of a construction of the fixing device 7 according to a first exemplary embodiment that is incorporated in the image forming apparatus 1 described above.

FIG. 2 is a schematic vertical sectional view of a main section of the fixing device 7. As shown in FIG. 2, the fixing device 7 (e.g., a fuser or a fusing unit) includes a fixing belt 20, a pressure roller 21, a fixing pad 22, a heating roller 23, a halogen heater 24, a plate spring 25, and a fixing stay 26. The fixing belt 20 serves as an endless belt. The pressure roller 21 serves as a rotary driver that contacts an outer circumferential surface of the fixing belt 20 to drive and rotate the fixing belt 20. The fixing pad 22 serves as an opposed belt support that is in contact with an inner circumferential surface of the fixing belt 20 and is disposed opposite the pressure roller 21 via the fixing belt 20. The heating roller 23 serves as a rotary belt support that is in contact with the inner circumferential surface of the fixing belt 20 and is disposed opposite the pressure roller 21 via the fixing pad 22. The plate spring 25 serves as a tension applicator that exerts tension to the fixing belt 20. The halogen heater 24 serves as a heat generator or a heater that heats the fixing belt 20 via the heating roller 23. The fixing stay 26 serves as an opposed belt support holder that holds the fixing pad 22.

A detailed description is now given of a configuration of the fixing belt 20.

The fixing belt 20 is looped over and supported by the fixing pad 22 and the heating roller 23. The plate spring 25 disposed opposite the inner circumferential surface of the fixing belt 20 presses against the fixing belt 20, exerting a predetermined tension to the fixing belt 20. The fixing pad 22 presses against the pressure roller 21 via the fixing belt 20 with predetermined pressure, forming a fixing nip N between the fixing belt 20 and the pressure roller 21.

A detailed description is now given of a configuration of the halogen heater 24.

The halogen heater 24 heats the heating roller 23 which in turn heats the fixing belt 20 so that the fixing belt 20 heats a sheet P as the sheet P is conveyed through the fixing nip N. According to this exemplary embodiment, the halogen heater 24 is disposed inside the heating roller 23. Alternatively, the halogen heater 24 may be disposed opposite the outer circumferential surface of the fixing belt 20. Yet alternatively, a heat generator or a heater may be disposed opposite the fixing pad 22 to heat the fixing pad 22. The heat generator or the heater may be a halogen heater, an induction heater (IH) incorporating an IH coil, a resistance heat generator, a carbon heater, or the like. The heat generator or the heater may be disposed inside the pressure roller 21 to heat the pressure roller 21. The heat generator or the heater may heat the heating roller 23 and the fixing pad 22 that have a thermal capacity smaller than that of the pressure roller 21 to save energy.

The pressure roller 21 is driven and rotated in a rotation direction A. The heating roller 23 is driven and rotated in a rotation direction B. Accordingly, the fixing belt 20 is driven and rotated in a rotation direction C while the fixing belt 20 slides over the fixing pad 22. Optionally, a slide sheet having a decreased friction coefficient may be sandwiched between the fixing pad 22 and the fixing belt 20 to facilitate sliding of the fixing belt 20 over the fixing pad 22.

With reference to FIG. 2, a description is provided of a fixing operation performed by the fixing device 7.

As the image forming apparatus 1 depicted in FIG. 1 is powered on, the halogen heater 24 is supplied with power and the pressure roller 21 and the heating roller 23 are driven and rotated in the rotation directions A and B, respectively. As the fixing belt 20 is driven and rotated by the heating roller 23 heated by the halogen heater 24, the heating roller 23 heats the fixing belt 20 which in turn heats the fixing nip N.

When the fixing nip N is heated to a predetermined fixing temperature, as a sheet P bearing an unfixed toner image T is conveyed through the fixing nip N in a sheet conveyance direction DP, the fixing belt 20 and the pressure roller 21 melt toner of the toner image T, thus fixing the toner image T on the sheet P under heat and pressure. Then, the sheet P bearing the fixed toner image T is discharged from the fixing nip N while being separated from the fixing belt 20.

A description is provided of a construction of a holding mechanism and a driving force transmitter of the fixing device 7 according to the first exemplary embodiment.

Figure 3:
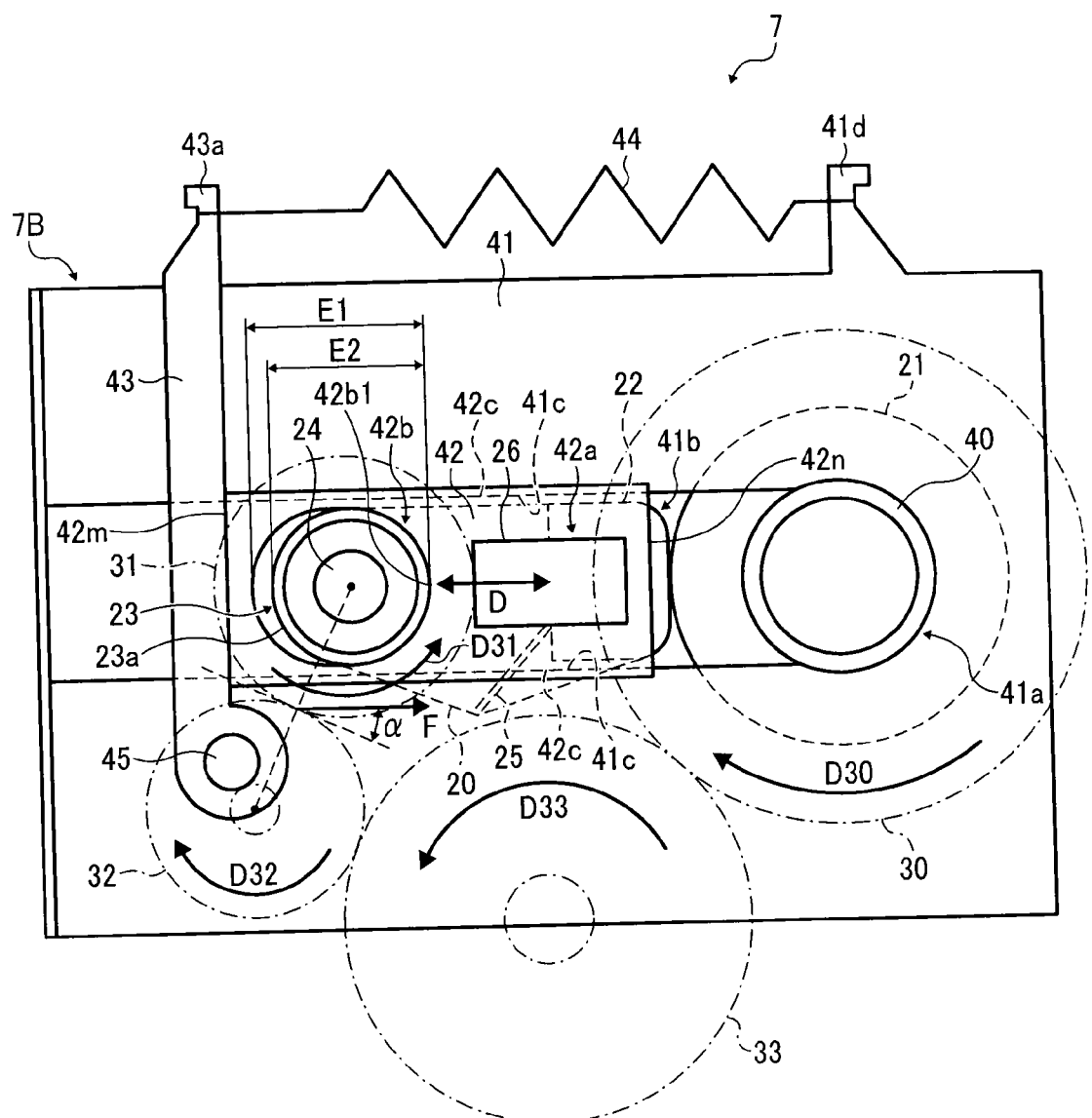
FIG. 3 is a vertical sectional view of the fixing device shown in FIG. 2 illustrating a holding mechanism and a driving force transmitter incorporated therein.

The holding mechanism holds the pressure roller 21, the fixing pad 22, and the heating roller 23. The driving force transmitter transmits a driving force to the pressure roller 21 and the heating roller 23. FIG. 3 is a vertical sectional view of the fixing device 7 according to the first exemplary embodiment illustrating the holding mechanism and the driving force transmitter.

First, a description is provided of a construction of the driving force transmitter.

The driving force transmitter includes a pressure roller gear 30 mounted on one lateral end of the pressure roller 21 in an axial direction thereof; a heating roller gear 31 mounted on one lateral end of the heating roller 23 in an axial direction thereof; and two relay gears, that is, a first gear 32 meshing with the heating roller gear 31 and a second gear 33 meshing with the pressure roller gear 30.

The second gear 33 also meshes with a driving gear located inside the image forming apparatus 1. As a driving force generated by a driving source (e.g., a motor) is transmitted from the driving gear to the second gear 33, the driving force is transmitted from the second gear 33 to the pressure roller gear 30. The driving force is also transmitted from the second gear 33 to the heating roller gear 31 through the first gear 32. Thus, the driving force transmitted as described above drives and rotates the pressure roller 21 and the heating roller 23.

Next, a description is provided of a construction of the holding mechanism.

Both lateral ends of the pressure roller 21 in the axial direction thereof are rotatably mounted on a pair of platy frames 41 of the fixing device 7 through a pair of bearings 40, respectively. Each bearing 40 is inserted into and mounted in a pressure roller holding through-hole 41a provided in each frame 41. Thus, the pressure roller 21 is held by the frames 41 such that an axis of the pressure roller 21 is fixed relative to the frames 41.

The fixing pad 22 and the heating roller 23 are movably held by the frames 41. For example, the fixing pad 22 and the heating roller 23 are held by a belt support holder 42 movably attached to each frame 41. The belt support holder 42 is provided with a fixing pad holding through-hole 42a serving as an opposed belt support holding through-hole and a heating roller holding through-hole 42b serving as a rotary belt support holding through-hole. The fixing stay 26 holding the fixing pad 22 is inserted into the fixing pad holding through-hole 42a. An axial end 23a, that is, each lateral end, of the heating roller 23 in the axial direction thereof is rotatably inserted into the heating roller holding through-hole 42b.

The frame 41 includes a belt support holder holding through-hole 41b that movably holds the belt support holder 42. The belt support holder 42 is inserted into the belt support holder holding through-hole 41b. An edge of the belt support holder holding through-hole 41b is inserted into a pair of grooves 42c of the belt support holder 42. The edge of the belt support holder holding through-hole 41b inserted into the grooves 42c constitutes a guide 41c. The guide 41c extends linearly in a direction D in which the belt support holder 42 moves closer to and away from the pressure roller 21. Accordingly, as the belt support holder 42 moves along the guide 41c, the fixing pad 22 and the heating roller 23 move linearly in a direction (e.g., the direction D) in which the fixing pad 22 and the heating roller 23 move closer to and away from the pressure roller 21.

The fixing device 7 further includes a pressure lever 43 and a pressure spring 44 serving as a biasing assembly that biases the fixing pad 22 against the pressure roller 21. The pressure lever 43 is pivotable about a shaft 45 disposed at one end of the pressure lever 43 and mounted on the frame 41. The pressure spring 44 is anchored to an engagement portion 43a (e.g., a hook) disposed at another end of the pressure lever 43 and an engagement portion 41d of the frame 41 such that the pressure spring 44 is stretched across the engagement portions 43a and 41d. The pressure spring 44 exerts a tensile force that presses the pressure lever 43 against a pressure lever side end 42m serving as a biasing assembly side end, that is, a left end in FIG. 3, of the belt support holder 42 opposite a pressure roller side end 42n serving as a rotary driver side end disposed opposite the pressure roller 21. Thus, the pressure lever 43 moves the belt support holder 42 toward the pressure roller 21. Accordingly, the belt support holder 42 biases the fixing pad 22 against the pressure roller 21, positioning the fixing pad 22 relative to the pressure roller 21 and forming the fixing nip N between the fixing belt 20 and the pressure roller 21 as shown in FIG. 2.

Since the pressure lever 43 presses against the belt support holder 42, if the heating roller holding through-hole 42b is deformed by pressure from the pressure lever 43, the heating roller 23 may not rotate smoothly, increasing a rotation torque of the heating roller 23. To address this circumstance, a length E1 of the heating roller holding through-hole 42b in a pressurization direction of the pressure lever 43 corresponding to the direction D is greater than a length E2 of the axial end 23a of the heating roller 23 in the pressurization direction of the pressure lever 43. Accordingly, even if the heating roller holding through-hole 42b is deformed by pressure from the pressure lever 43, the heating roller holding through-hole 42b having the length E1 retains smooth rotation of the heating roller 23, preventing increase of the rotation torque of the heating roller 23.

A description is provided of a construction of a comparative fixing device 7C 1.

Figure 4:
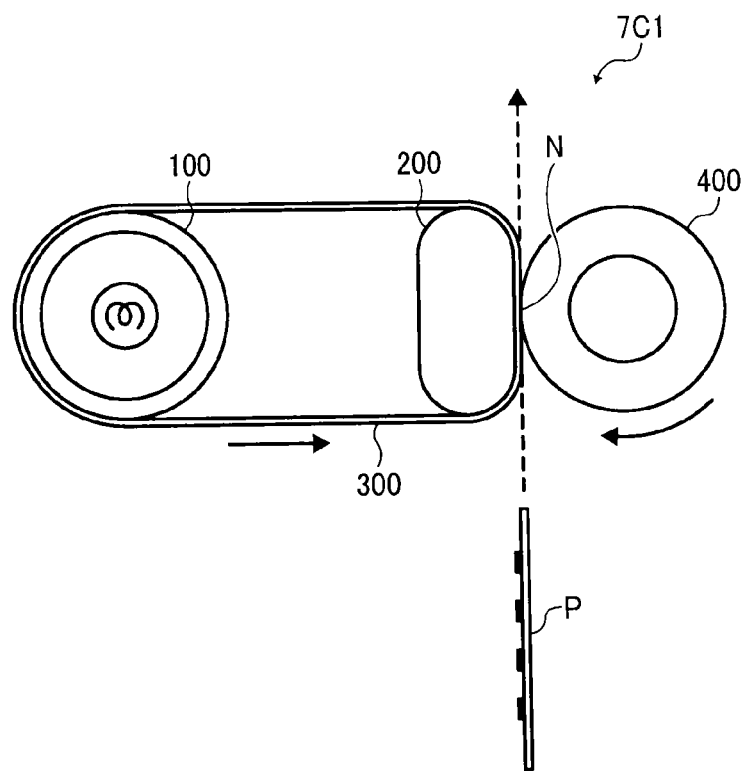
FIG. 4 is a schematic vertical sectional view of a comparative fixing device.

FIG. 4 is a schematic vertical sectional view of the comparative fixing device 7C1. As shown in FIG. 4, the comparative fixing device 7C1 includes a heating roller 100, a fixing pad 200 spaced apart from the heating roller 100, an endless fixing belt 300 looped over the heating roller 100 and the fixing pad 200, and a pressure roller 400 pressed against the fixing pad 200 via the fixing belt 300 to form a fixing nip N between the fixing belt 300 and the pressure roller 400. The fixing belt 300 is heated by a heater disposed inside the heating roller 100 and is driven and rotated counterclockwise in FIG. 4 by the pressure roller 400 rotating clockwise in FIG. 4. As a sheet P bearing a toner image is conveyed through the fixing nip N, the fixing belt 300 and the pressure roller 400 fix the toner image on the sheet P under heat and pressure.

In order to form the fixing nip N, at least one of the pressure roller 400 and the fixing pad 200 is pressed against another one of the pressure roller 400 and the fixing pad 200. If the pressure roller 400 is configured to be movable with respect to the fixing pad 200, the pressure roller 400 serving as a driving roller that drives and rotates the fixing belt 300 may vary pressure exerted at the fixing nip N (hereinafter referred to as the fixing nip pressure) depending on a driving force transmitted to the pressure roller 400.

The driving force transmitted from a driving source to the pressure roller 400 through a gear train may generate a force that moves the pressure roller 400 closer to the fixing belt 300 or a force that moves the pressure roller 400 away from the fixing belt 300 according to a mesh position of the gear train. Accordingly, the fixing nip pressure may increase or decrease. Additionally, the fixing nip pressure may change as a torque generated at the gear train changes over time. Hence, if the pressure roller 400 is movable, the fixing nip pressure may change, degrading stability of a fixing property of fixing the toner image on the sheet P properly under desired pressure.

If the gear train is disposed at one lateral end of the pressure roller 400 in an axial direction thereof, one lateral end of the fixing belt 300 in an axial direction thereof contacting the one lateral end of the pressure roller 400 may suffer from variation in the fixing nip pressure caused by the driving force transmitted to the pressure roller 400. Accordingly, the fixing belt 300 may suffer from variation in the fixing nip pressure between one lateral end and another lateral end of the fixing belt 300 in the axial direction thereof. Consequently, the fixing belt 300 may be skewed, resulting in breakage.

To address this circumstance, the fixing pad 200, instead of the pressure roller 400, may be configured to be movable. However, as the fixing pad 200 moves with respect to the stationary heating roller 100, an interval, that is, a distance, between the heating roller 100 and the fixing pad 200 may change, resulting in change in tension exerted to the fixing belt 300. As the tension exerted to the fixing belt 300 increases, a driving torque to rotate the fixing belt 300 increases. Conversely, as the tension exerted to the fixing belt 300 decreases, the fixing belt 300 is susceptible to skew and resultant breakage.

The above-described problems resulting from change in the tension exerted to the fixing belt 300 caused by change in the distance between the heating roller 100 and the fixing pad 200 may also occur in a belt device having a construction similar to that of the comparative fixing device 7C1.

A description is provided of operation and advantages of the fixing device 7 according to the first exemplary embodiment by comparing the fixing device 7 with another comparative fixing device 7C2.

First, a description is provided of a construction and disadvantages of the comparative fixing device 7C2.

Figure 5:
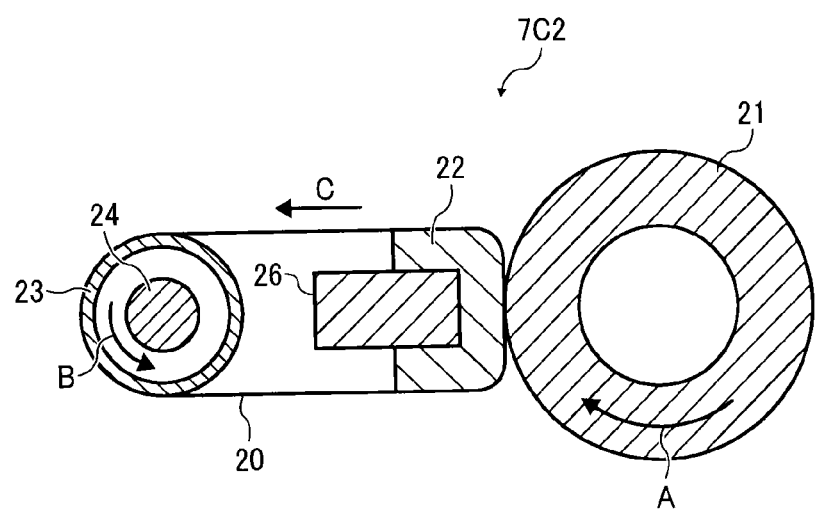
FIG. 5 is a schematic vertical sectional view of another comparative fixing device.

FIG. 5 is a schematic vertical sectional view of a main section of the comparative fixing device 7C2. Like the fixing device 7 according to the first exemplary embodiment shown in FIG. 2, the comparative fixing device 7C2 includes the fixing belt 20, the pressure roller 21, the fixing pad 22, the heating roller 23, the halogen heater 24, and the fixing stay 26. The pressure roller 21 and the heating roller 23 are driven and rotated in the rotation directions A and B, respectively. The fixing belt 20 is driven and rotated in the rotation direction C while sliding over the fixing pad 22.

Figure 6:
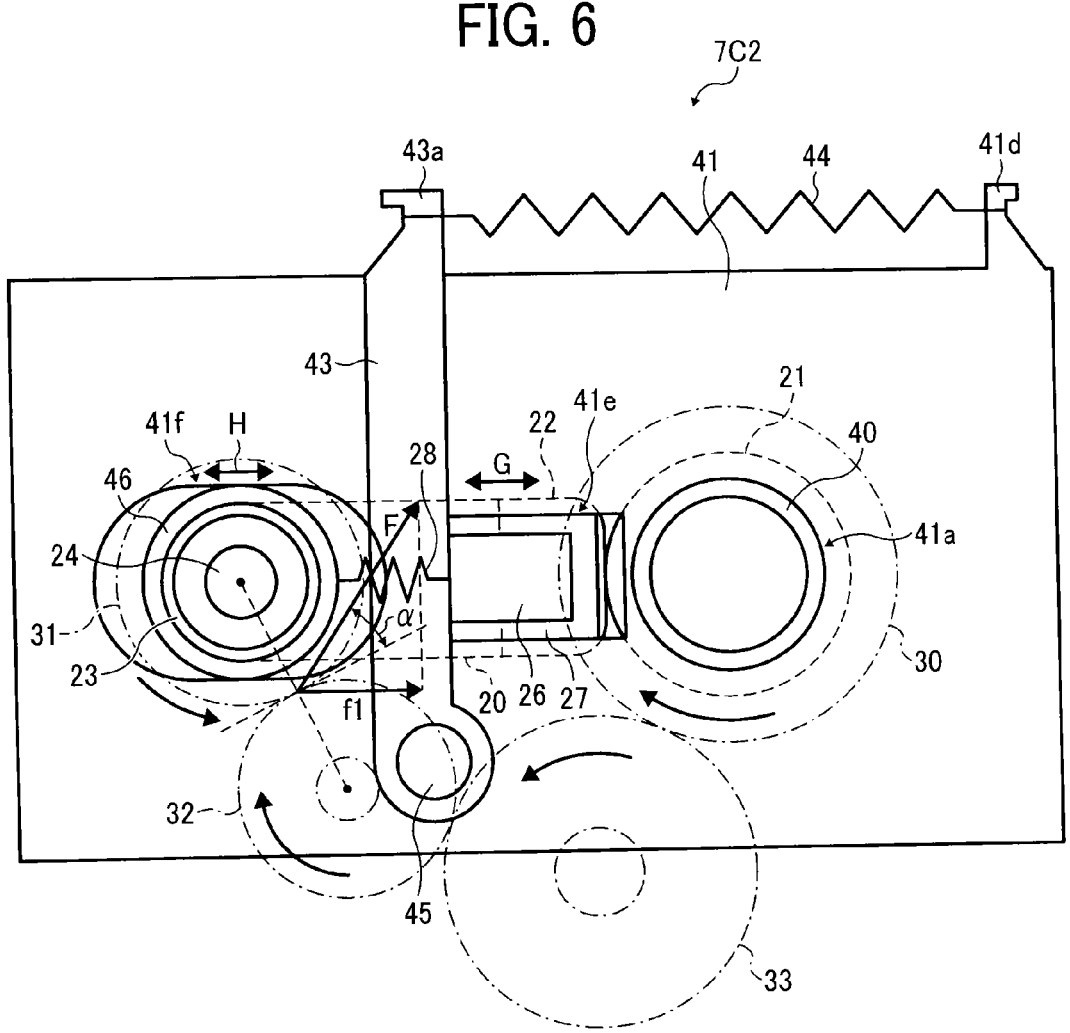
FIG. 6 is a schematic vertical sectional view of the comparative fixing device shown in FIG. 5 illustrating a holding mechanism and a driving force transmitter incorporated therein.

FIG. 6 is a schematic vertical sectional view of the comparative fixing device 7C2 illustrating a holding mechanism and a driving force transmitter. The driving force transmitter of the comparative fixing device 7C2 is equivalent to the driving force transmitter of the fixing device 7 shown in FIG. 3. For example, the driving force transmitter of the comparative fixing device 7C2 includes the pressure roller gear 30, the heating roller gear 31, and the two relay gears, that is, the first gear 32 and the second gear 33. A driving force generated by a driving source (e.g., a motor) is transmitted to the pressure roller 21 and the heating roller 23 through those gears.

Conversely, the holding mechanism of the comparative fixing device 7C2 is different from the holding mechanism of the fixing device 7 shown in FIG. 3 in a construction holding the fixing pad 22 and the heating roller 23. The fixing pad 22 and the heating roller 23 are held separately such that the fixing pad 22 and the heating roller 23 are movable independently, unlike the fixing pad 22 and the heating roller 23 of the fixing device 7 that are held by the belt support holder 42 such that the fixing pad 22 and the heating roller 23 are movable together.

For example, the fixing pad 22 is held by the fixing stay 26 held by a stay holder 27. The stay holder 27 is inserted into a fixing pad holding through-hole 41e provided in each of the pair of frames 41 such that the stay holder 27 is movable in a direction G. Accordingly, the fixing pad 22 is movable in the direction G in which the fixing pad 22 moves closer to and away from the pressure roller 21.

Both lateral ends of the heating roller 23 in the axial direction thereof are rotatably mounted on the pair of platy frames 41 through a pair of bearings 46, respectively. Each of the bearings 46 is inserted into a heating roller holding through-hole 41f provided in each of the frames 41 such that the bearing 46 is movable in a direction H. Accordingly, the heating roller 23 is also movable in the direction H in which the heating roller 23 moves closer to and away from the pressure roller 21.

A coil spring 28 serving as a tension applicator is interposed between the fixing pad 22 and the heating roller 23. The coil spring 28 biases against the heating roller 23 to separate the heating roller 23 from the fixing pad 22 so that the heating roller 23 and the fixing pad 22 exert tension to the fixing belt 20. Unlike the pressure lever 43 of the fixing device 7 shown in FIG. 3, the pressure lever 43 of the comparative fixing device 7C2 presses against the fixing stay 26 that in turn presses the fixing pad 22 against the pressure roller 21 via the fixing belt 20.

The comparative fixing device 7C2 includes a holding mechanism to hold the pressure roller 21 that is equivalent to the holding mechanism to hold the pressure roller 21 of the fixing device 7. Hence, the pressure roller 21 is held by the frames 41 such that the axis of the pressure roller 21 is fixed relative to the frames 41.

As a driving force generated by the driving source is transmitted to the comparative fixing device 7C2, the second gear 33 rotates counterclockwise in FIG. 6 to rotate the pressure roller gear 30 clockwise and rotate the first gear 32 clockwise. The first gear 32 rotates the heating roller gear 31 counterclockwise. Taking a force received by the heating roller gear 31, the heating roller gear 31 receives a driving force F from the first gear 32. The driving force F defines a force generated by teeth of the first gear 32 that press against teeth of the heating roller gear 31 and exerted in a direction inclined by a pressure angle α from a perpendicular line perpendicular to a linear line defined by an axis of the heating roller gear 31 and an axis of the first gear 32.

A parallel component f1 (hereinafter referred to as the heating roller moving direction component f1) of the driving force F that is parallel to the direction H in which the heating roller 23 moves is exerted in a direction in which the heating roller 23 moves toward the pressure roller 21. The heating roller moving direction component f1 is exerted in a direction opposite a biasing direction in which the coil spring 28 exerts a bias to the heating roller 23. Accordingly, the bias of the coil spring 28 is decreased by the size of the heating roller moving direction component f1, decreasing tension exerted to the fixing belt 20. Since the driving force F is produced at one lateral end of the heating roller 23 in the axial direction thereof that mounts the heating roller gear 31, the tension exerted to the fixing belt 20 is decreased at one lateral end of the fixing belt 20 in an axial direction thereof. Accordingly, the tension exerted to the fixing belt 20 may vary between one lateral end and another lateral end of the fixing belt 20 in the axial direction thereof, resulting in skew of the fixing belt 20. Consequently, the skewed fixing belt 20 may surmount a skew restrictor and may be damaged.

As a first method of eliminating variation in the tension exerted to the fixing belt 20, for example, the bias of the coil spring 28 anchored to one lateral end of the heating roller 23 in the axial direction thereof that mounts the heating roller gear 31 may be increased to offset the heating roller moving direction component f1. However, since the heating roller moving direction component f1 changes in accordance with change in torque of the heating roller gear 31 over time, even if the bias of the coil spring 28 is adjusted, variation in the tension exerted to the fixing belt 20 may not be overcome for an extended period of time.

As a second method of eliminating variation in the tension exerted to the fixing belt 20, the axis of the heating roller 23 is fixed to prevent the heating roller 23 from being moved by the heating roller moving direction component f1. However, this method may cause another problem of changing an interval, that is, a distance, between the heating roller 23 and the fixing pad 22 as the fixing pad 22 moves. The position of the fixing pad 22 changes over time as the outer diameter and the rigidity of a surface rubber layer of the pressure roller 21 change. Accordingly, as the position of the fixing pad 22 changes, the interval between the heating roller 23 and the fixing pad 22 changes. Accordingly, the tension exerted to the fixing belt 20 changes. As the tension exerted to the fixing belt 20 increases, the driving torque to rotate the fixing belt 20 increases, generating noise and stopping the motor. Conversely, as the tension exerted to the fixing belt 20 decreases, the fixing belt 20 is susceptible to skew and resultant breakage.

To address those problems, the fixing device 7 according to the first exemplary embodiment shown in FIG. 3 includes the belt support holder 42 that holds and moves the heating roller 23 and the fixing pad 22 together while retaining the interval between the heating roller 23 and the fixing pad 22. Thus, the belt support holder 42 prevents the tension exerted to the fixing belt 20 from changing as the interval between the heating roller 23 and the fixing pad 22 changes.

As shown in FIG. 3, since the heating roller holding through-hole 42b is greater than the axial end 23a of the heating roller 23, an axis of the heating roller 23 is not fixed relative to the heating roller holding through-hole 42b. Accordingly, if the heating roller 23 moves inside the heating roller holding through-hole 42b, the interval between the heating roller 23 and the fixing pad 22 changes. However, the heating roller 23 is pressed against a fixing pad side edge 42b1, that is, a right edge in FIG. 3, of the heating roller holding through-hole 42b by two forces described below and positioned relative to the fixing pad 22, retaining the predetermined interval between the heating roller 23 and the fixing pad 22.

A first force that presses the heating roller 23 against the fixing pad side edge 42b1 of the heating roller holding through-hole 42b is the tension exerted to the fixing belt 20. As shown in FIG. 2, the fixing belt 20 looped over the heating roller 23 is exerted with tensions T1 and T2. The heating roller 23 is exerted with a resultant force J of the tensions T1 and T2. The resultant force J is exerted in a direction in which the heating roller 23 moves toward the pressure roller 21. Accordingly, the resultant force J presses the heating roller 23 against the fixing pad side edge 42b1, that is, the right edge in FIG. 3, of the heating roller holding through-hole 42b.

A second force is a driving force received by the heating roller gear 31 from the first gear 32. As the second gear 33, the pressure roller gear 30, the first gear 32, and the heating roller gear 31 arranged as shown in FIG. 3 rotate in rotation directions D33, D30, D32, and D31, respectively, the heating roller gear 31 receives the driving force F from the first gear 32. The driving force F is exerted in a direction in which the heating roller 23 moves toward the pressure roller 21. Accordingly, the driving force F presses the heating roller 23 against the fixing pad side edge 42b1, that is, the right edge in FIG. 3, of the heating roller holding through-hole 42b.

As described above, the heating roller 23 is pressed against the fixing pad side edge 42b1 of the heating roller holding through-hole 42b by the tension exerted to the fixing belt 20 and the driving force F transmitted from the first gear 32 through the heating roller gear 31 and positioned relative to the fixing pad 22, retaining the predetermined interval between the heating roller 23 and the fixing pad 22 through the belt support holder 42. Accordingly, even if the position of the fixing pad 22 changes as the outer diameter and the rigidity of the pressure roller 21 change, the heating roller 23 moves in accordance with motion of the fixing pad 22, retaining the predetermined interval between the heating roller 23 and the fixing pad 22. Consequently, the belt support holder 42 prevents the tension exerted to the fixing belt 20 from changing as the interval between the heating roller 23 and the fixing pad 22 changes, thus preventing various faults caused by change in the tension exerted to the fixing belt 20.

The pair of belt support holders 42 is constructed of identical parts to reduce variation in the position of the heating roller 23 and the fixing pad 22 between one lateral end and another lateral end of the fixing belt 20 in the axial direction thereof. Thus, the belt support holder 42 suppresses variation in the tension exerted to the fixing belt 20 depending on variation in the position of the heating roller 23 and the fixing pad 22 in the axial direction of the fixing belt 20, thus suppressing skew of the fixing belt 20.

As described above, since the heating roller 23 is pressed against the fixing pad side edge 42b1 of the heating roller holding through-hole 42b as the heating roller gear 31 receives the driving force, the belt support holder 42 receives the bias exerted to the heating roller 23. Accordingly, the belt support holder 42 prevents the bias exerted to one lateral end of the heating roller 23 in the axial direction thereof from changing the tension exerted to the fixing belt 20, thus preventing variation in the tension exerted to the fixing belt 20 and resultant skew of the fixing belt 20.

Alternatively, in order to prevent variation in the tension exerted to the fixing belt 20, the heating roller 23 may be driven and rotated by the fixing belt 20 without mounting the heating roller gear 31. In this case, the driving force is not transmitted to the heating roller 23 through the second gear 33, the first gear 32, and the heating roller gear 31, preventing variation in the tension exerted to the fixing belt 20.

However, since the motor drives and rotates the pressure roller 21 only, the fixing belt 20 may slip relative to the pressure roller 21. To address this circumstance, the pressure roller 21 includes a grip portion disposed at each lateral end of the pressure roller 21 in the axial direction thereof and constructed of a frictional silicone rubber layer or the like that contacts the fixing belt 20 with an increased friction therebetween to grip the fixing belt 20. However, the grip portion is disposed outboard from a tube layer facilitating separation of the sheet P from the pressure roller 21 in the axial direction thereof, which constitutes a conveyance span on the pressure roller 21 where the sheet P is conveyed, thus increasing the width of the pressure roller 21 in the axial direction thereof and upsizing the fixing device 7.

To address this circumstance, the fixing device 7 according to this exemplary embodiment includes the heating roller 23 driven and rotated by the motor, preventing slippage of the fixing belt 20 without the grip portion disposed at each lateral end of the pressure roller 21 in the axial direction thereof. Thus, the heating roller 23 rotates the fixing belt 20 stably while downsizing the fixing device 7.

According to this exemplary embodiment, like the heating roller 23, the pressure roller 21 receives a driving force transmitted through a gear train disposed at one lateral end of the pressure roller 21 in the axial direction thereof. Accordingly, the pressure roller 21 is also exerted with a bias as the pressure roller 21 receives the driving force at one lateral end of the pressure roller 21 in the axial direction thereof. If the bias generated at one lateral end of the pressure roller 21 in the axial direction thereof changes pressure exerted at the fixing nip N, the pressure exerted at the fixing nip N varies in a width direction of the fixing nip N parallel to the axial direction of the pressure roller 21, resulting in skew of the fixing belt 20.

To address this circumstance, according to this exemplary embodiment, the axis of the pressure roller 21 is retained at a fixed position constantly. Accordingly, even if the pressure roller 21 receives the driving force at one lateral end of the pressure roller 21 in the axial direction thereof, the pressure roller 21 is not susceptible to the bias generated by the driving force. Consequently, variation in pressure exerted at the fixing nip N caused by the driving force exerted to the pressure roller 21 is prevented, thus preventing skew of the fixing belt 20 precisely.

Table 1 below shows a result of an endurance test for comparing endurance of an image forming apparatus incorporating the comparative fixing device 7C2 with endurance of the image forming apparatus 1 incorporating the fixing device 7 according to the first exemplary embodiment. The endurance test uses a print chart having an image area ratio of 5 percent to print a toner image on one side of three sheets repeatedly to examine whether or not the fixing belt 20 suffers from skew and breakage. In Table 1, k denotes 1,000 sheets.

TABLE 1

| Configuration | Skew and breakage of fixing belt 20 |
| --- | --- |
| Comparative fixing device 7C2 | Breakage upon printing on 105k sheets |
| Fixing device 7 | No breakage upon printing on 200k sheets |

As shown in Table 1, with the comparative fixing device 7C2, the fixing belt 20 suffers from breakage upon printing on 105k sheets. Conversely, with the fixing device 7 according to the first exemplary embodiment, the fixing belt 20 suffers from no breakage even upon printing on 200k sheets. The result of the endurance test shows that the fixing device 7 according to the first exemplary embodiment suppresses skew and resultant breakage of the fixing belt 20 more effectively than the comparative fixing device 7C2.

A description is provided of various exemplary embodiments of fixing devices other than the fixing device 7 according to the first exemplary embodiment by explaining differences from the first exemplary embodiment.

It is to be noted that the construction and the configuration of the fixing devices that are identical to those of the fixing device 7 according to the first exemplary embodiment described above are omitted because the identical construction and configuration achieve similar operation and advantages.

A description is provided of a construction of a fixing device 7S according to a second exemplary embodiment.

Figure 7:
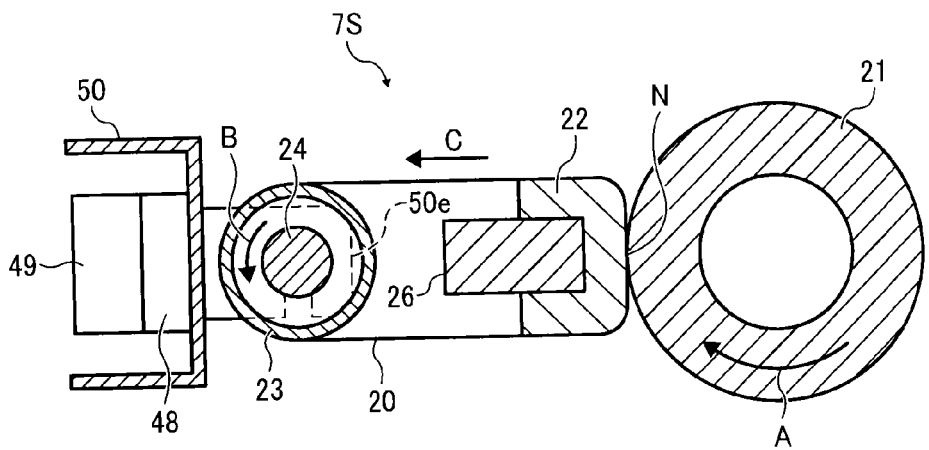
FIG. 7 is a schematic vertical sectional view of a fixing device according to a second exemplary embodiment of the present disclosure.

FIG. 7 is a schematic vertical sectional view of a main section of the fixing device 7S. As shown in FIG. 7, in addition to the fixing belt 20, the pressure roller 21, the fixing pad 22, the heating roller 23, the halogen heater 24, and the fixing stay 26, the fixing device 7S includes a thermistor 48 and a thermostat 49 serving as a temperature detector and a temperature detector holder 50 that holds the thermistor 48 and the thermostat 49. The fixing device 7S does not include the plate spring 25 serving as a tension applicator shown in FIG. 2. Instead, the fixing pad 22 and the heating roller 23 are fixed at positions where the fixing pad 22 is spaced apart from the heating roller 23 to exert a predetermined tension to the fixing belt 20. Thus, the fixing pad 22 and the heating roller 23 serve as a tension applicator.

FIG. 7 corresponds to multiple embodiments, although the gears and other features have been omitted for the sake of clarity. Therefore, FIG. 7 illustrates, for example, the general features of the various embodiments including the fourth embodiment illustrated in FIG. 15.

A detailed description is now given of a configuration of the thermistor 48 and the thermostat 49.

The thermistor 48 is a temperature sensor that detects the temperature of the fixing belt 20 to adjust the temperature of the fixing nip N. The thermostat 49 connected to a power line connected to the halogen heater 24 is a temperature sensor that interrupts power supply to the halogen heater 24 when the temperature of the fixing belt 20 increases to a predetermined temperature or higher. According to this exemplary embodiment, the thermistor 48 does not contact the fixing belt 20. Alternatively, the thermistor 48 may contact the fixing belt 20. Further, a fuse may be used instead of the thermostat 49. The thermistor 48 and the thermostat 49 may detect the temperature of the heating roller 23.

A detailed description is now given of a construction of the temperature detector holder 50.

Figure 8:
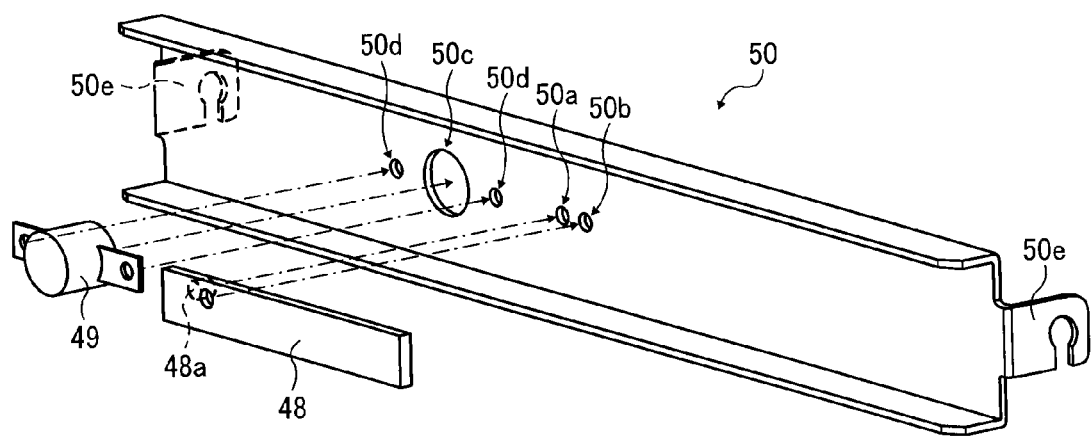
FIG. 8 is a perspective view of a temperature detector holder incorporated in the fixing device shown in FIG. 7.

FIG. 8 is a perspective view of the temperature detector holder 50. The temperature detector holder 50 is manufactured by folding a rectangular plate on two parallel long edges thereof at a right angle. The temperature detector holder 50 includes a through-hole 50a into which a projection 48a of the thermistor 48 is inserted; a screw hole 50b through which a screw fastens the thermistor 48 to the temperature detector holder 50; a through-hole 50c into which a body of the thermostat 49 is inserted; and a plurality of screw holes 50d through which a plurality of screws fastens the thermostat 49 to the temperature detector holder 50. The temperature detector holder 50 further includes a pair of heater holding portions 50e that holds both lateral ends of the halogen heater 24 in a longitudinal direction thereof.

A description is provided of a construction of a holding mechanism and a driving force transmitter of the fixing device 7S.

Figure 9:
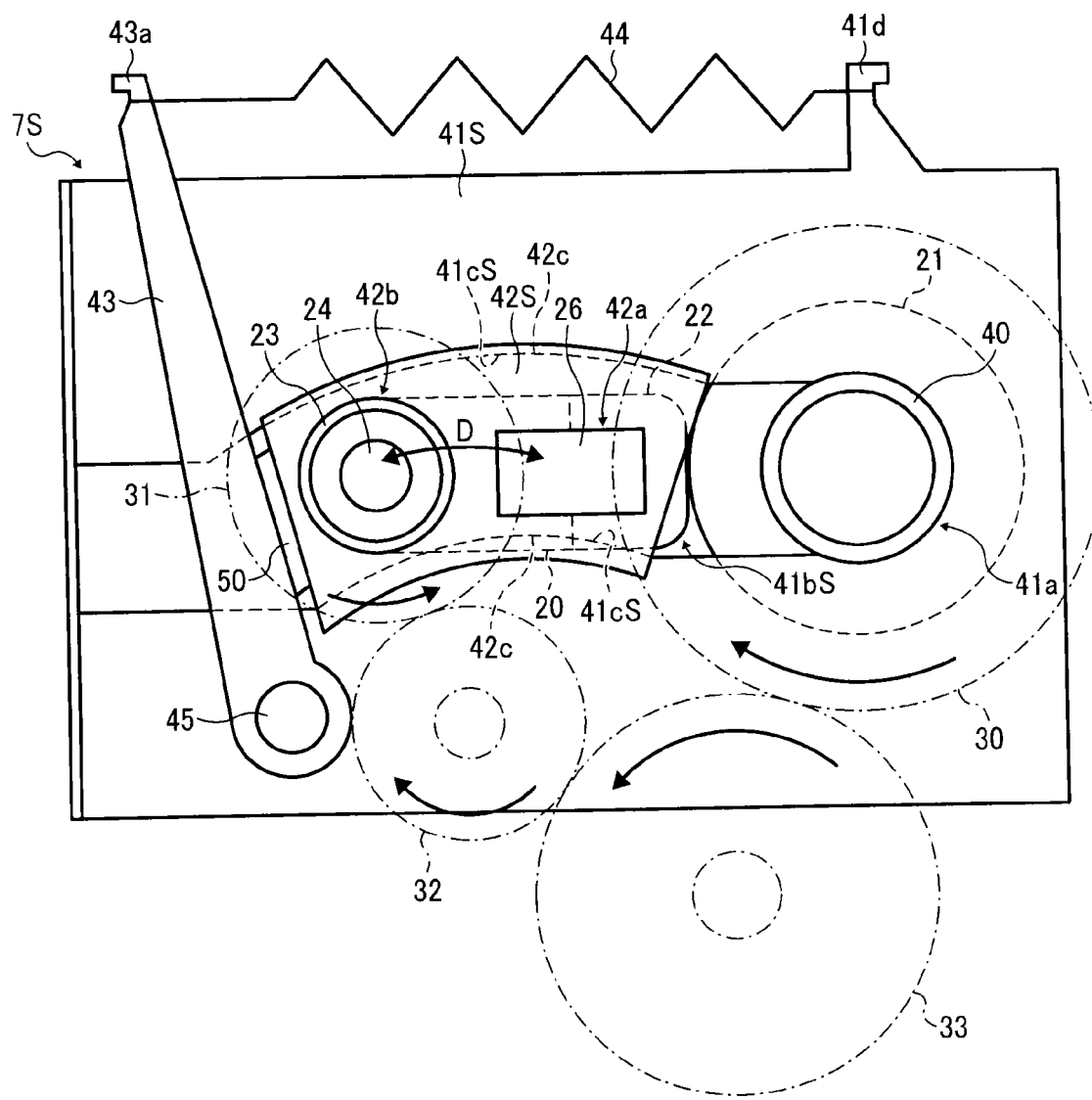
FIG. 9 is a schematic vertical sectional view of the fixing device shown in FIG. 7 illustrating a holding mechanism and a driving force transmitter incorporated therein.

FIG. 9 is a schematic vertical sectional view of the fixing device 7S illustrating the holding mechanism and the driving force transmitter. As shown in FIG. 9, the fixing device 7S includes a frame 41S including a belt support holder holding through-hole 41bS that has a guide 41cS contoured into an arch curved about the axis of the first gear 32. Accordingly, as a belt support holder 42S moves along the arcuate guide 41cS, the heating roller 23 and the heating roller gear 31 held by the belt support holder 42S move arcuately. Since the heating roller gear 31 moves arcuately about the axis of the first gear 32 meshing with the heating roller gear 31, a distance between the axis of the first gear 32 and the axis of the heating roller gear 31 is constant.

According to the second exemplary embodiment, even when the belt support holder 42S moves, the distance between the axis of the first gear 32 and the axis of the heating roller gear 31 is constant, retaining precise mesh of the first gear 32 with the heating roller gear 31 and attaining stable transmission of the driving force from the first gear 32 to the heating roller gear 31.

Additionally, the temperature detector holder 50 moves together with the belt support holder 42S. For example, the pressure lever 43 presses against the temperature detector holder 50 to bring the temperature detector holder 50 into contact with the belt support holder 42S. As the belt support holder 42S moves, the temperature detector holder 50 moves in accordance with motion of the belt support holder 42S while the temperature detector holder 50 contacts the belt support holder 42S.

The temperature detector holder 50 moving together with the belt support holder 42S retains a constant distance of the thermistor 48 and the thermostat 49 with respect to the heating roller 23 and the fixing belt 20. Accordingly, the temperature detector holder 50 prevents degradation in accuracy in detecting the temperature of the fixing belt 20 which may occur as the distance between the temperature detector (e.g., the thermistor 48 and the thermostat 49) and a temperature detection object (e.g., the fixing belt 20) changes, attaining precise temperature detection by the temperature detector.

Additionally, the temperature detector holder 50 holding the halogen heater 24 retains a positional relation between the heating roller 23 and the halogen heater 24. Accordingly, even if the heating roller 23 has a decreased diameter, the temperature detector holder 50 prevents the halogen heater 24 from coming into contact with the heating roller 23.

A description is provided of a construction of a holding mechanism and a driving force transmitter of a fixing device 7T according to a third exemplary embodiment.

Figure 10:
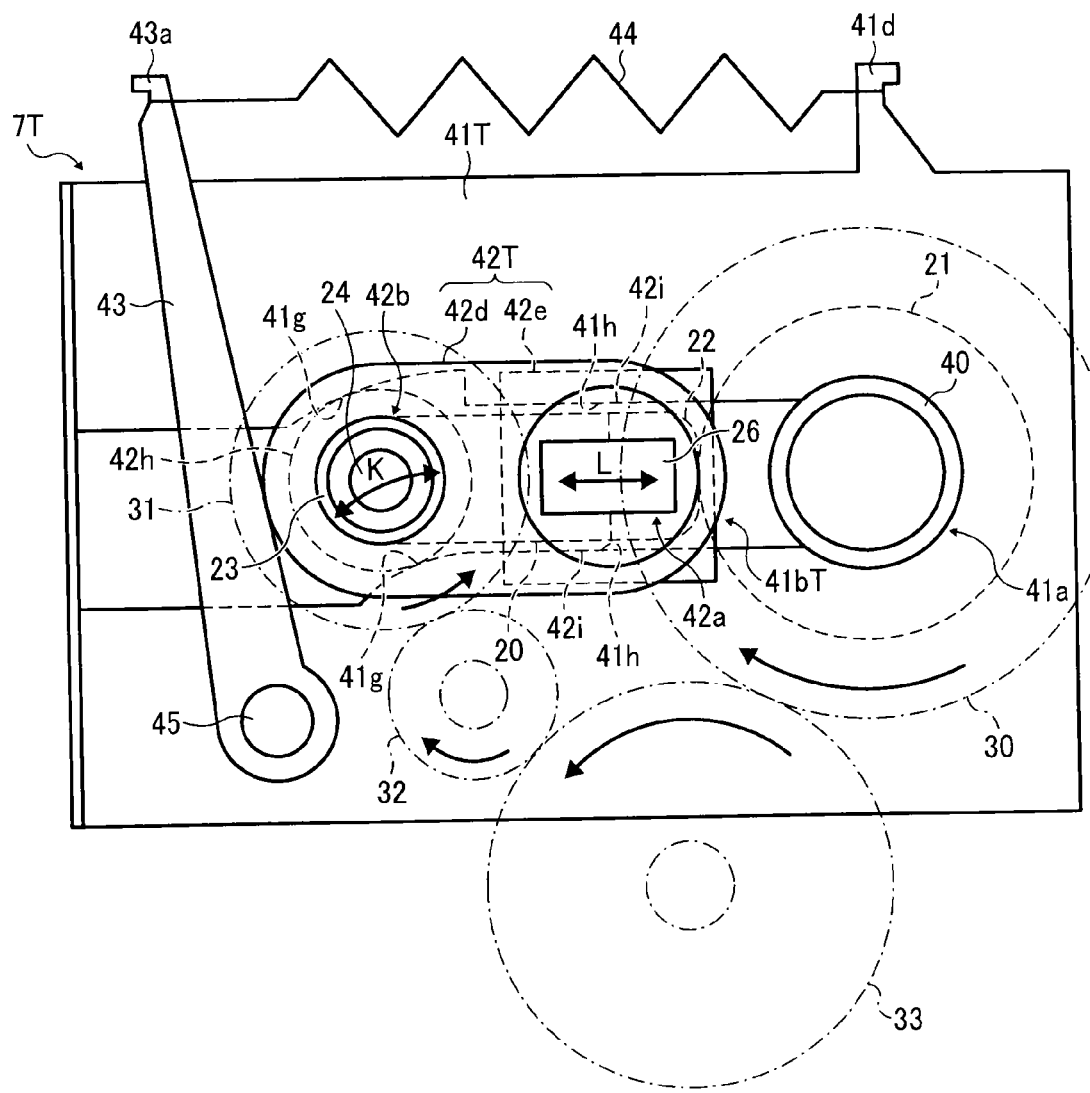
FIG. 10 is a schematic vertical sectional view of a fixing device according to a third exemplary embodiment of the present disclosure illustrating a holding mechanism and a driving force transmitter incorporated therein.

FIG. 10 is a schematic vertical sectional view of the fixing device 7T illustrating the holding mechanism and the driving force transmitter. As shown in FIG. 10, the fixing device 7T includes a frame 41T including a belt support holder holding through-hole 41bT that has an arcuate guide 41g and a linear guide 41h. The arcuate guide 41g is contoured into an arch curved about the axis of the first gear 32. The linear guide 41h extends linearly in a direction L in which a belt support holder 42T moves closer to and away from the pressure roller 21.

Additionally, the belt support holder 42T is constructed of two components. A first component is a heating roller holding portion 42d serving as a rotary belt support holding portion that holds the heating roller 23 serving as a rotary belt support. A second component is a fixing pad holding portion 42e serving as an opposed belt support holding portion that holds the fixing pad 22 serving as an opposed belt support.

Figure 11:
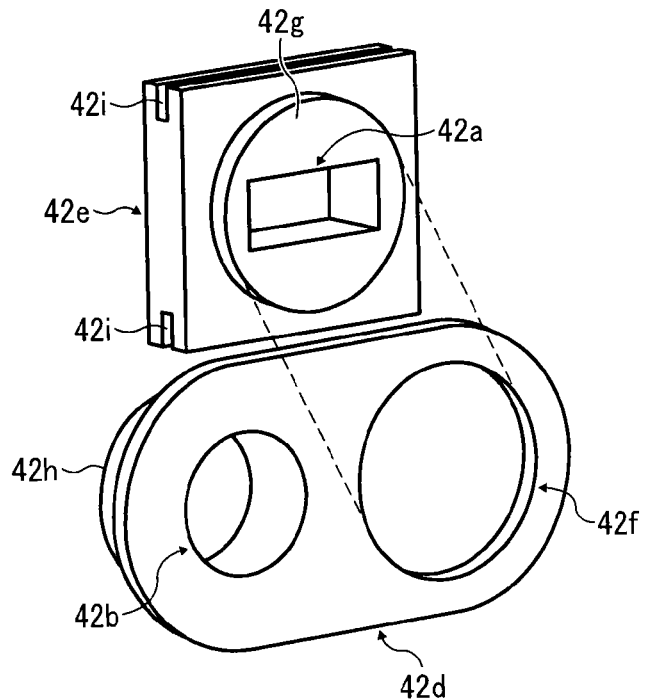
FIG. 11 is a perspective view of a heating roller holding portion and a fixing pad holding portion incorporated in the fixing device shown in FIG. 10 before assembling.

FIG. 11 is a perspective view of the heating roller holding portion 42d and the fixing pad holding portion 42e before assembling. As shown in FIG. 11, the heating roller holding portion 42d includes the heating roller holding through-hole 42b into which the axial end 23a of the heating roller 23 is rotatably inserted and an engaging through-hole 42f to which the fixing pad holding portion 42e is attached for assembling. The fixing pad holding portion 42e includes an engaging projection 42g to be inserted into the engaging through-hole 42f and the fixing pad holding through-hole 42a into which the fixing stay 26 is inserted.

The heating roller holding portion 42d further includes a slide projection 42h that slides over the arcuate guide 41g depicted in FIG. 10. The slide projection 42h is concentric with the heating roller holding through-hole 42b. The fixing pad holding portion 42e further includes a pair of grooves 42i to engage the linear guides 41h depicted in FIG. 10, respectively.

Figure 12:
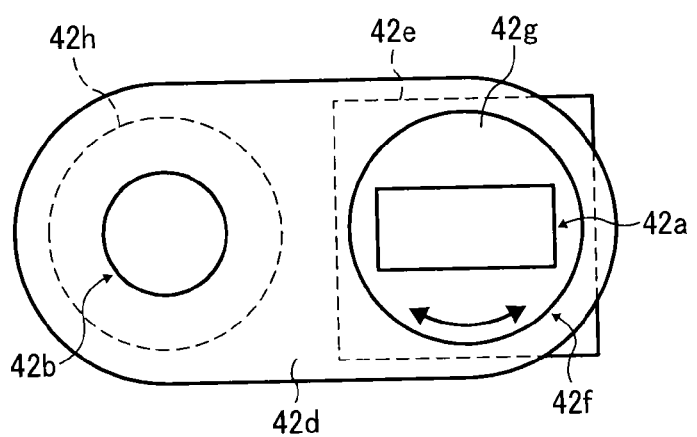
FIG. 12 is a sectional view of the heating roller holding portion and the fixing pad holding portion shown in FIG. 11 after assembling.

FIG. 12 is a sectional view of the heating roller holding portion 42d and the fixing pad holding portion 42e after assembling. The engaging projection 42g is inserted into the engaging through-hole 42f to assemble the fixing pad holding portion 42e to the heating roller holding portion 42d. Each of the engaging projection 42g and the engaging through-hole 42f is circular. The heating roller holding portion 42d and the fixing pad holding portion 42e are relatively rotatable about an axis of an outer circumference of the engaging projection 42g in a state in which the fixing pad holding portion 42e is assembled to the heating roller holding portion 42d. The heating roller 23 held by the heating roller holding portion 42d and the fixing pad 22 held by the fixing pad holding portion 42e are behind the heating roller holding portion 42d and the fixing pad holding portion 42e in FIG. 12.

A description is provided of movement of the heating roller holding portion 42d and the fixing pad holding portion 42e.

Figure 13A:
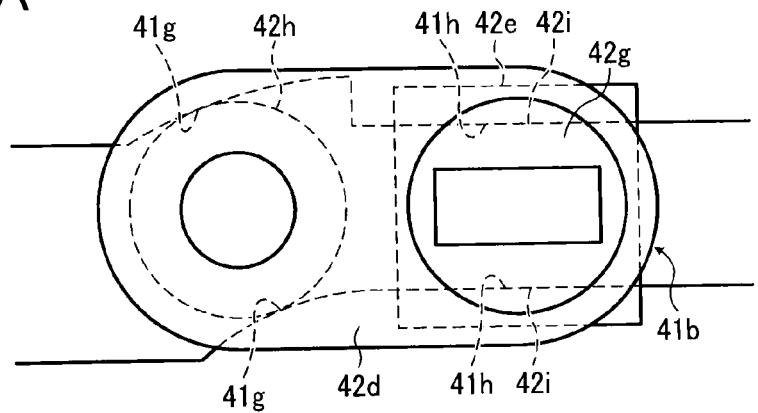
FIG. 13A is a sectional view of the heating roller holding portion and the fixing pad holding portion shown in FIG. 12 before movement.
Figure 13B:
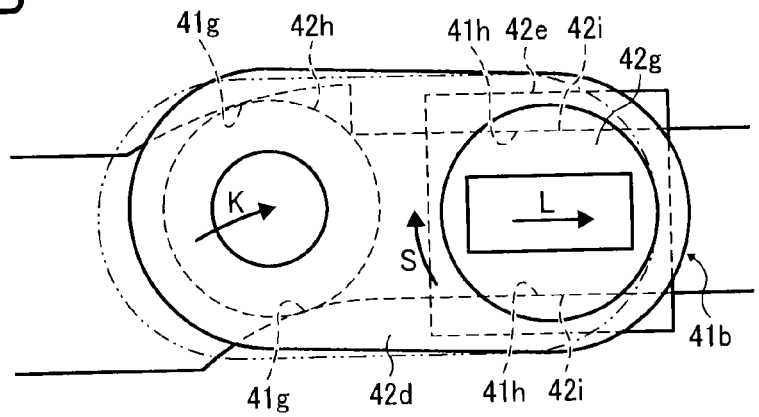
FIG. 13B is a sectional view of the heating roller holding portion and the fixing pad holding portion shown in FIG. 12 after movement.

FIG. 13A is a sectional view of the heating roller holding portion 42d and the fixing pad holding portion 42e before movement. FIG. 13B is a sectional view of the heating roller holding portion 42d and the fixing pad holding portion 42e after movement.

As the heating roller holding portion 42d and the fixing pad holding portion 42e move rightward in FIG. 13A, the slide projection 42h of the heating roller holding portion 42d moves arcuately along the arcuate guide 41g in a direction K shown in FIG. 13B. Conversely, the fixing pad holding portion 42e moves linearly along the linear guide 41h in the direction L shown in FIG. 13B. Thus, the slide projection 42h of the heating roller holding portion 42d draws a trajectory different from that of the fixing pad holding portion 42e. Accordingly, as the slide projection 42h of the heating roller holding portion 42d and the fixing pad holding portion 42e move, a positional relation between the slide projection 42h and the fixing pad holding portion 42e changes vertically in FIG. 13B. However, the change in the positional relation is allowed or offset by rotation of the heating roller holding portion 42d about the engaging projection 42g of the fixing pad holding portion 42e in a rotation direction S. Further, as the heating roller holding portion 42d rotates about the engaging projection 42g, the predetermined distance between the heating roller 23 and the fixing pad 22 is retained.

As shown in FIG. 10, as the slide projection 42h of the heating roller holding portion 42d moves arcuately, the heating roller 23 and the heating roller gear 31 held by the heating roller holding portion 42d move about the axis of the first gear 32 arcuately in the direction K. Accordingly, like in the second exemplary embodiment, even when the belt support holder 42T moves, the distance between the axis of the first gear 32 and the axis of the heating roller gear 31 is constant, retaining precise mesh of the first gear 32 with the heating roller gear 31 and attaining stable transmission of the driving force from the first gear 32 to the heating roller gear 31.

Conversely, as the fixing pad holding portion 42e moves linearly, the fixing pad 22 held by the fixing pad holding portion 42e moves linearly in a direction in which the fixing pad 22 moves closer to and away from the pressure roller 21 in the direction L. Thus, as the fixing pad 22 moves linearly, the position and the direction of the fixing pad 22 pressing against the pressure roller 21 do not change.

Figure 14:
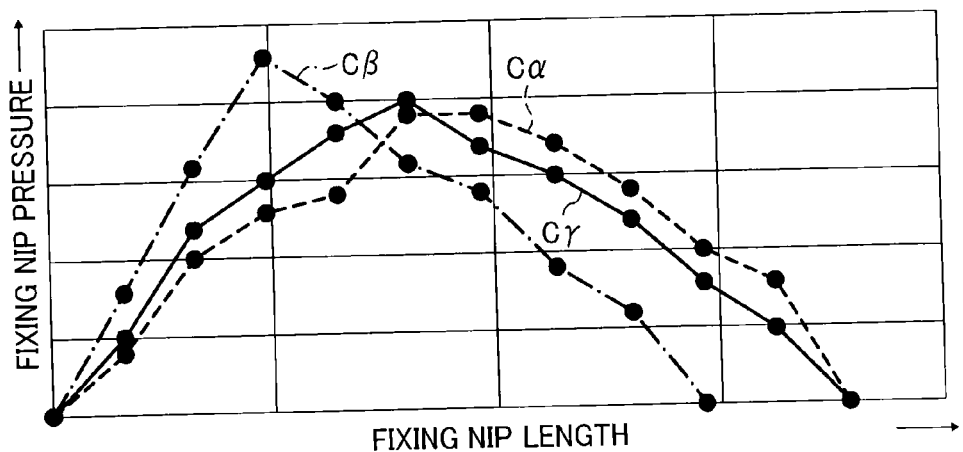
FIG. 14 is a graph showing a relation between a fixing nip length and fixing nip pressure of the fixing devices shown in FIGS. 9 and 10.

FIG. 14 is a graph showing a relation between the length of the fixing nip N in the sheet conveyance direction DP (hereinafter referred to as the fixing nip length) and pressure exerted at the fixing nip N (hereinafter referred to as the fixing nip pressure) that changes as the belt support holder 42S of the fixing device 7S according to the second exemplary embodiment depicted in FIG. 9 and the belt support holder 42T of the fixing device 7T according to the third exemplary embodiment depicted in FIG. 10 move.

FIG. 14 illustrates a curve Cα in a dotted line indicating the relation between the fixing nip length and the fixing nip pressure of the fixing devices 7S and 7T that use the pressure roller 21 before the endurance test. FIG. 14 illustrates a curve Cβ in a long and short dashed line and a curve Cγ in a solid line indicating the relation between the fixing nip length and the fixing nip pressure of the fixing devices 7S and 7T that use the pressure roller 21 after the endurance test. The curve Cβ indicates the relation between the fixing nip length and fixing nip pressure of the fixing device 7S according to the second exemplary embodiment. The curve Cγ indicates the relation between the fixing nip length and the fixing nip pressure of the fixing device 7T according to the third exemplary embodiment. The pressure roller 21 after the endurance test has a decreased surface hardness and a decreased outer diameter after performing a print job of printing on one side of three sheets with a print chart at an image area ratio of 5 percent repeatedly until printing on 100 k sheets finishes.

As shown in FIG. 14, the curve Cα obtained with the pressure roller 21 before the endurance test attains the identical relation between the fixing nip length and the fixing nip pressure with the fixing device 7S according to the second exemplary embodiment and the fixing device 7T according to the third exemplary embodiment. For example, a peak of the fixing nip pressure is at a middle of the fixing nip length. Conversely, the curve Cβ obtained with the fixing device 7S according to the second exemplary embodiment using the pressure roller 21 after the endurance test has a peak of the fixing nip pressure that is shifted from the middle of the fixing nip length and a decreased fixing nip length. The curve Cγ obtained with the fixing device 7T according to the third exemplary embodiment using the pressure roller 21 after the endurance test retains a peak of the fixing nip pressure that is at the middle of the fixing nip length and the fixing nip length that is equivalent to the fixing nip length of the curve Cα.

It is presumed that the difference between the curves Cβ and Cγ is caused by the difference in the direction in which the fixing pad 22 moves between the fixing device 7S according to the second exemplary embodiment and the fixing device 7T according to the third exemplary embodiment. Since the pressure roller 21 after the endurance test has a decreased surface hardness, the pressure roller 21 may be deformed substantially by pressure from the fixing pad 22. Accordingly, the fixing pad 22 moves from an initial position before the endurance test toward the pressure roller 21. In the fixing device 7S according to the second exemplary embodiment, the fixing pad 22 moves arcuately. Accordingly, the fixing pad 22 presses against the pressure roller 21 at a position shifted from a target pressurization position where the fixing pad 22 presses against the pressure roller 21 and therefore tilts relative to the pressure roller 21. Consequently, the curve Cβ has the peak of the fixing nip pressure that is shifted from the middle of the fixing nip length and the decreased fixing nip length. Conversely, the fixing pad 22 of the fixing device 7T according to the third exemplary embodiment moves linearly, suppressing change in the position and the direction of the fixing pad 22 pressing against the pressure roller 21. Consequently, the curve Cγ does not have the peak of the fixing nip pressure that is shifted from the middle of the fixing nip length and the decreased fixing nip length.

As described above, with the fixing device 7T according to the third exemplary embodiment, even if the fixing pad 22 moves, the fixing device 7T attains the curve Cγ that retains the peak of the fixing nip pressure and the fixing nip length that are equivalent to those of the curve Cα. Hence, the fixing device 7T according to the third exemplary embodiment attains a desired fixing property of fixing the toner image T on the sheet P properly and a desired separation property of separating the sheet P from the fixing belt 20 precisely.

A description is provided of a construction of a holding mechanism and a driving force transmitter of a fixing device 7U according to a fourth exemplary embodiment.

Figure 15:
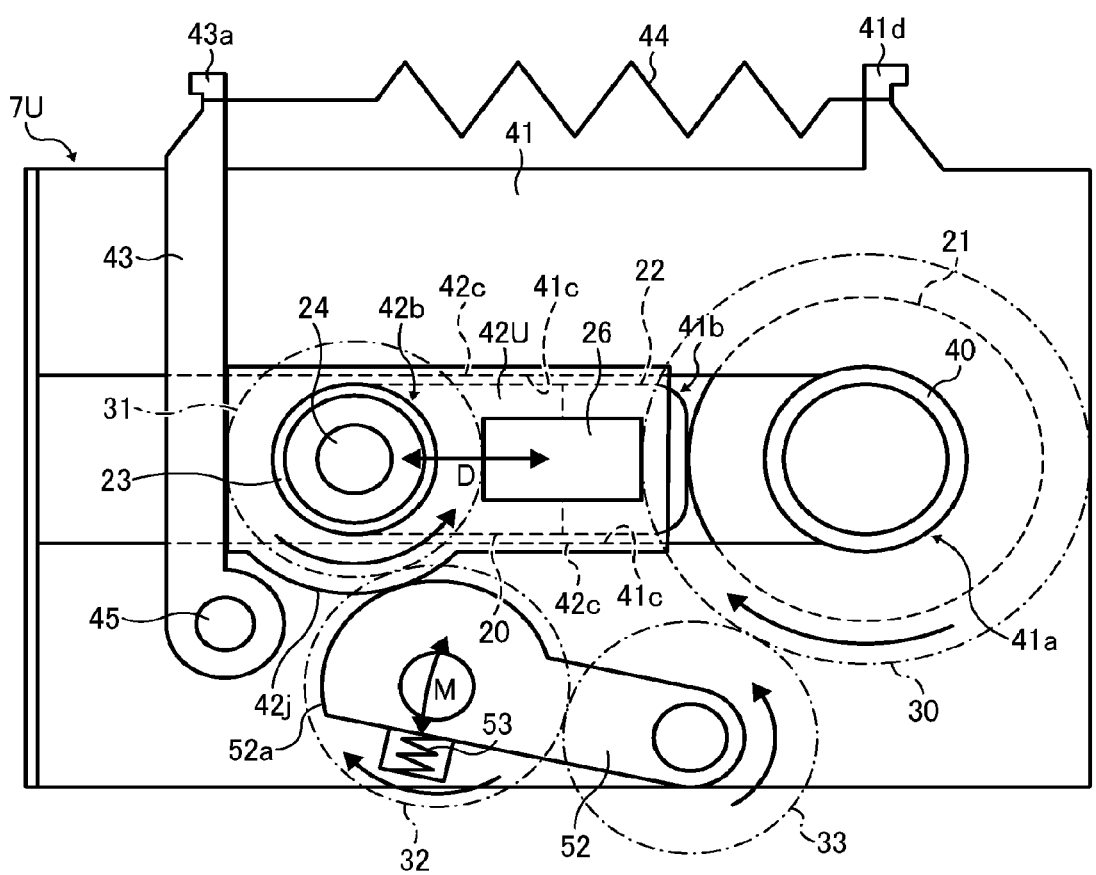
FIG. 15 is a schematic vertical sectional view of a fixing device according to a fourth exemplary embodiment of the present disclosure illustrating a holding mechanism and a driving force transmitter incorporated therein.

FIG. 15 is a schematic vertical sectional view of the fixing device 7U illustrating the holding mechanism and the driving force transmitter. As shown in FIG. 15, the fixing device 7U includes a gear holder 52 pivotably mounted on the second gear 33 to hold the first gear 32 such that the first gear 32 is movable arcuately in a direction M about an axis of the second gear 33.

A pressure spring 53 serving as a biasing member presses against the gear holder 52 upward in FIG. 15 toward the heating roller gear 31. Thus, the pressure spring 53 biases the first gear 32 against the heating roller gear 31. The pressure spring 53 biases the gear holder 52 against a belt support holder 42U, bringing the gear holder 52 into contact with the belt support holder 42U. The gear holder 52 includes an arcuate restrictor 52a. The belt support holder 42U includes an arcuate restrictor 42j that contacts the restrictor 52a of the gear holder 52. The restrictor 52a of the gear holder 52 is contoured into an arch curved about the axis of the first gear 32. The restrictor 42j of the belt support holder 42U is contoured into an arch curved about the axis of the heating roller gear 31.

Accordingly, as the belt support holder 42U moves linearly with respect to the pressure roller 21 in a direction in which the belt support holder 42U moves closer to and away from the pressure roller 21, the first gear 32 moves in accordance with motion of the heating roller gear 31 by a bias from the pressure spring 53. Since the first gear 32 moves arcuately about the axis of the second gear 33, a distance between the axis of the first gear 32 and the axis of the second gear 33 is constant, retaining precise mesh between the first gear 32 and the second gear 33.

The restrictor 52a of the gear holder 52 contacting the restrictor 42j of the belt support holder 42U prohibits the first gear 32 from moving closer to the heating roller gear 31 for a predetermined distance or more. Accordingly, even if the heating roller gear 31 moves, the distance between the axis of the first gear 32 and the axis of the heating roller gear 31 is constant. Thus, the first gear 32 meshes with the heating roller gear 31 precisely.

According to the fourth exemplary embodiment, even when the belt support holder 42U moves linearly, mesh between the heating roller gear 31 and the first gear 32 and mesh between the first gear 32 and the second gear 33 are retained precisely, attaining stable transmission of the driving force. Additionally, the fixing pad 22 moves linearly relative to the pressure roller 21, retaining the peak of the fixing nip pressure and the desired fixing nip length and therefore attaining the desired fixing property of fixing the toner image T on the sheet P properly and the desired separation property of separating the sheet P from the fixing belt 20 precisely.

A description is provided of a construction of a holding mechanism and a driving force transmitter of a fixing device 7V according to a fifth exemplary embodiment.

Figure 16:
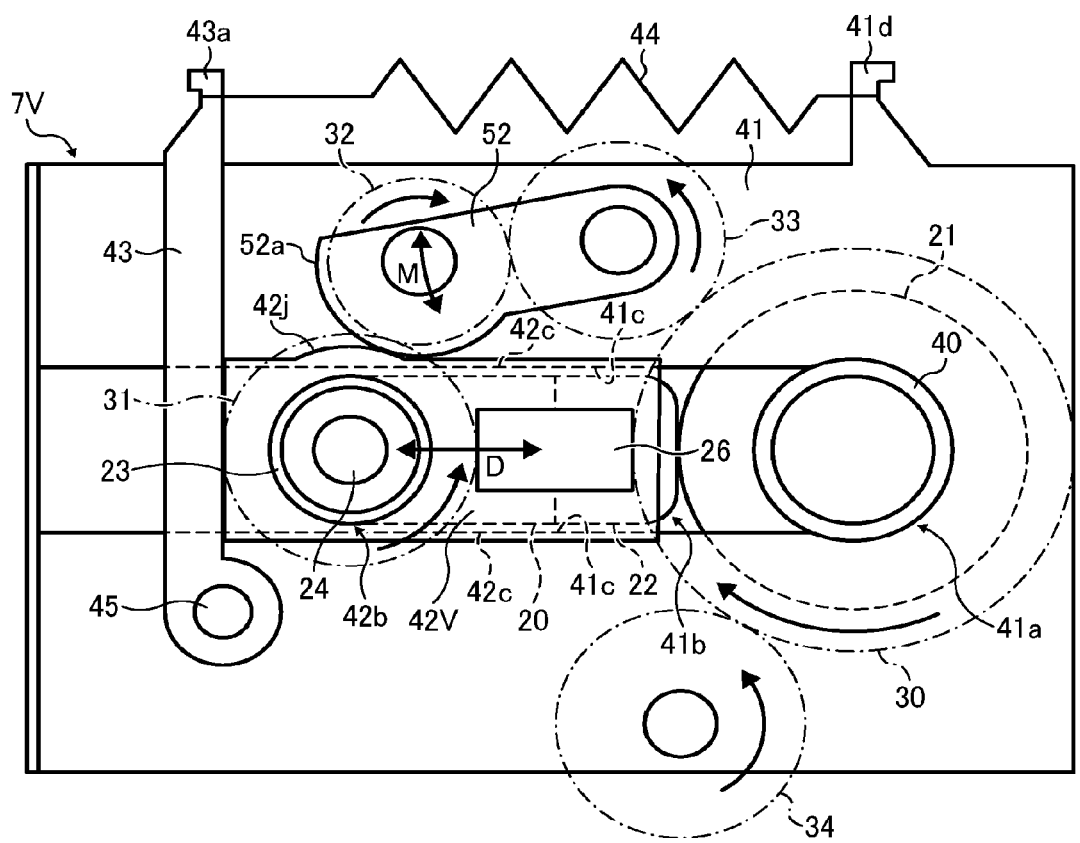
FIG. 16 is a schematic vertical sectional view of a fixing device according to a fifth exemplary embodiment of the present disclosure illustrating a holding mechanism and a driving force transmitter incorporated therein.

FIG. 16 is a schematic vertical sectional view of the fixing device 7V illustrating the holding mechanism and the driving force transmitter. As shown in FIG. 16, the fixing device 7V according to the fifth exemplary embodiment is different from the fixing device 7U according to the fourth exemplary embodiment in the arrangement of a plurality of gears. For example, the first gear 32 and the second gear 33 are disposed above the heating roller gear 31 in FIG. 16. The fixing device 7V includes a third gear 34 that meshes with the driving gear located inside the image forming apparatus 1. A driving force from the driving gear is transmitted to the pressure roller gear 30 through the third gear 34. The driving force is further transmitted from the pressure roller gear 30 to the heating roller gear 31 through the second gear 33 and the first gear 32.

Like the first gear 32 of the fixing device 7U according to the fourth exemplary embodiment shown in FIG. 15, the first gear 32 of the fixing device 7V according to the fifth exemplary embodiment is held by the gear holder 52 such that the first gear 32 is movable arcuately in the direction M about the axis of the second gear 33 in accordance with motion of the heating roller gear 31. However, unlike the fixing device 7U according to the fourth exemplary embodiment, the fixing device 7V according to the fifth exemplary embodiment does not incorporate the pressure spring 53 that biases the first gear 32 against a belt support holder 42V. Instead of a bias from the pressure spring 53, a weight of the first gear 32 and the gear holder 52 and a bias exerted between the first gear 32 and the heating roller gear 31 while the first gear 32 and the heating roller gear 31 are driven and rotated bias the first gear 32 against the heating roller gear 31.

Figure 17:
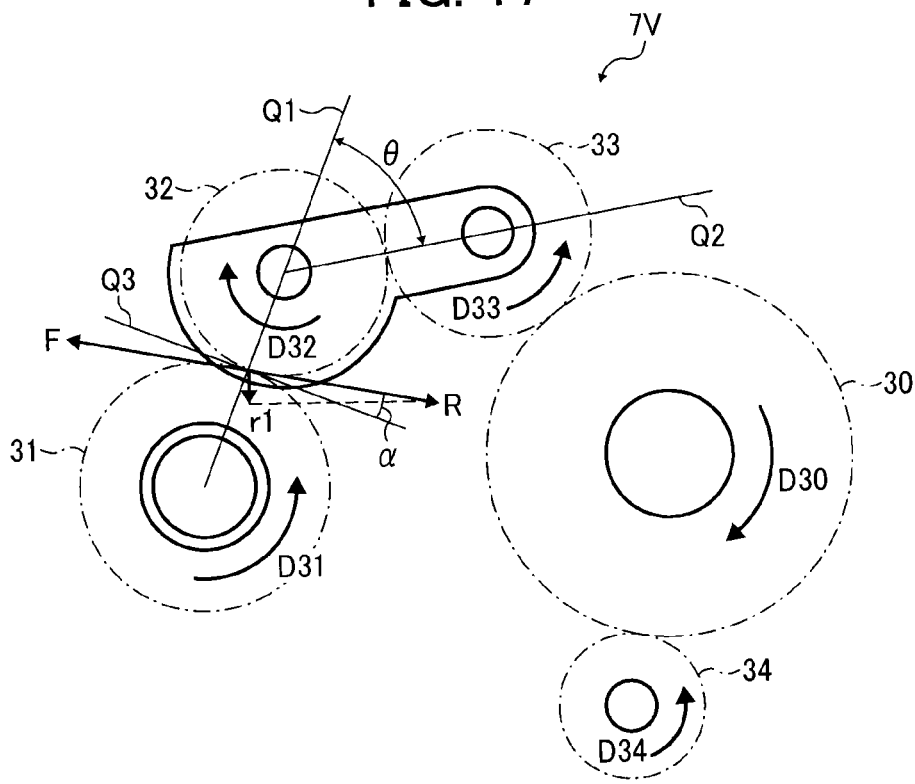
FIG. 17 is a schematic vertical sectional view of the fixing device shown in FIG. 16 illustrating a plurality of gears incorporated therein.

FIG. 17 is a schematic vertical sectional view of the fixing device 7V illustrating the third gear 34, the pressure roller gear 30, the second gear 33, the first gear 32, and the heating roller gear 31. As shown in FIG. 17, as the third gear 34, the pressure roller gear 30, the second gear 33, the first gear 32, and the heating roller gear 31 rotate in rotation directions D34, D30, D33, D32, and D31, respectively, the heating roller gear 31 receives a driving force F from the first gear 32. Conversely, the first gear 32 receives a reaction force R directed in a direction opposite a direction of the driving force F. The reaction force R is directed in the direction inclined by a pressure angle α from a perpendicular line Q3 perpendicular to a linear line Q1 defined by the axis of the heating roller gear 31 and the axis of the first gear 32. According to this exemplary embodiment, the reaction force R is directed obliquely downward in FIG. 17. The reaction force R has a component r1 directed in a direction in which the first gear 32 moves toward the heating roller gear 31. The component r1 biases the first gear 32 against the heating roller gear 31.

The component r1 of the reaction force R biasing the first gear 32 against the heating roller gear 31 satisfies a following formula (1).

$$-90°-\alpha \leq \theta \leq 90°-\alpha \tag{1}$$

In the formula (1), θ represents an angle defined by the linear line Q1 defined by the axis of the heating roller gear 31 and the axis of the first gear 32 and a linear line Q2 defined by the axis of the first gear 32 and the axis of the second gear 33 in the rotation direction D32 of the first gear 32 rotating clockwise in FIG. 17. For example, if the pressure angle α is 20 degrees, the angle θ is defined by a formula (2) below.

$$-110° \leq \theta \leq 70° \tag{2}$$

Figure 18:
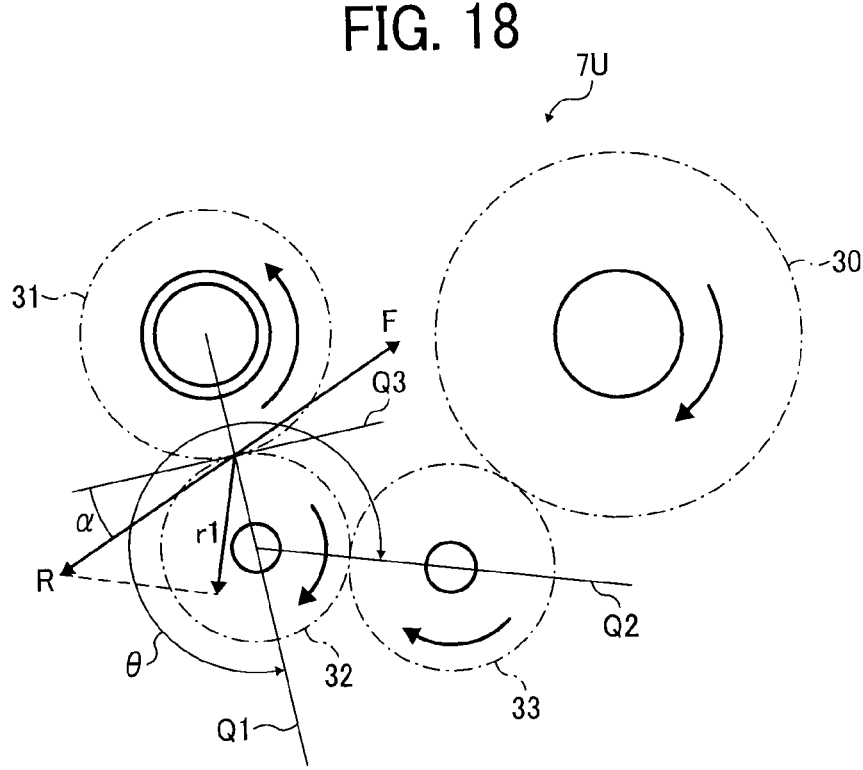
FIG. 18 is a schematic vertical sectional view of the fixing device shown in FIG. 15 illustrating a plurality of gears incorporated therein.

FIG. 18 is a schematic vertical sectional view of the fixing device 7U illustrating the pressure roller gear 30, the second gear 33, the first gear 32, and the heating roller gear 31. As shown in FIG. 18 illustrating the arrangement of the plurality of gears of the fixing device 7U according to the fourth exemplary embodiment, the angle θ is 300 degrees. Accordingly, if the pressure angle α is 20 degrees, the angle θ does not satisfy the formula (2) above. Consequently, the fixing device 7U according to the fourth exemplary embodiment does not attain a bias that biases the first gear 32 against the heating roller gear 31 by the driving force transmitted to the heating roller gear 31 from the first gear 32.

As described above, with the fixing device 7V according to the fifth exemplary embodiment shown in FIGS. 16 and 17, the weight of the first gear 32 and the gear holder 52 and the bias exerted between the first gear 32 and the heating roller gear 31 while the first gear 32 and the heating roller gear 31 are driven and rotated bias the first gear 32 against the heating roller gear 31. Accordingly, the fixing device 7V does not incorporate the biasing member that biases the first gear 32 against the heating roller gear 31, simplifying the construction of the fixing device 7V and reducing manufacturing costs.

The present disclosure is not limited to the details of the exemplary embodiments described above and various modifications and improvements are possible. The holding mechanism and the driving force transmitter incorporated in the fixing devices 7, 7S, 7T, 7U, and 7V are also applicable to a belt device that incorporates an endless belt.

A description is provided of operation and advantages of various configurations 1 to 15 of a belt device 7B and the fixing devices 7, 7S, 7T, 7U, and 7V.

It is to be noted that the belt device 7B defined below is installable in the fixing devices 7, 7S, 7T, 7U, and 7V.

A configuration 1 is defined by the belt device 7B shown in FIGS. 2 and 3. As shown in FIG. 3, the belt device 7B includes an endless belt (e.g., the fixing belt 20), a rotary driver (e.g., the pressure roller 21), an opposed belt support (e.g., the fixing pad 22), a rotary belt support (e.g., the heating roller 23), a tension applicator (e.g., the plate spring 25), a belt support holder (e.g., the belt support holder 42), and a biasing assembly (e.g., the pressure lever 43 and the pressure spring 44). The rotary driver contacts an outer circumferential surface of the belt to drive and rotate the belt. The opposed belt support is disposed opposite the rotary driver and in contact with an inner circumferential surface of the belt. The rotary belt support is disposed opposite the rotary driver via the opposed belt support and in contact with the inner circumferential surface of the belt. The tension applicator exerts tension to the belt. The belt support holder holds the opposed belt support and the rotary belt support to retain a predetermined interval between the opposed belt support and the rotary belt support. The biasing assembly presses against the belt support holder to move the opposed belt support and the rotary belt support collectively with respect to the rotary driver in a direction in which the opposed belt support and the rotary belt support move closer to and away from the rotary driver and to bias the opposed belt support against the rotary driver.

According to the configuration 1, the opposed belt support and the rotary belt support move collectively in the direction in which the opposed belt support and the rotary belt support move closer to and away from the rotary driver while retaining the predetermined interval between the opposed belt support and the rotary belt support, thus preventing change in tension exerted to the belt. Accordingly, the belt device 7B prevents increase in tension exerted to the belt, which may increase a driving torque. The belt device 7B also prevents decrease in tension exerted to the belt, which may skew the belt.

A configuration 2 is defined by the configuration 1 in which one lateral end of the rotary belt support in an axial direction thereof receives a driving force and the belt support holder receives a bias that generates at the one lateral end of the rotary belt support in the axial direction thereof as it is exerted with the driving force.

According to the configuration 2, the belt support holder, as it receives the bias generated at the one lateral end of the rotary belt support in the axial direction thereof, prevents the bias from changing the tension exerted to the belt. Accordingly, the belt support holder prevents variation in the tension exerted to the belt between one lateral end and another lateral end of the belt in an axial direction thereof and thereby prevents skew of the belt that results from variation in the tension exerted to the belt.

A configuration 3 is defined by the configuration 2 in which the rotary belt support mounts a rotary belt support gear (e.g., the heating roller gear 31) at the one lateral end of the rotary belt support in the axial direction thereof. The rotary belt support gear meshes with a first gear (e.g., the first gear 32) so that the driving force is transmitted to the rotary belt support through the first gear and the rotary belt support gear. As shown in FIGS. 9 and 10, the belt support holder (e.g., the belt support holders 42S and 42T) moves arcuately about an axis of the first gear.

According to the configuration 3, the belt support holder that moves arcuately about the axis of the first gear, even when the belt support holder moves, retains a constant distance between the axis of the first gear and an axis of the rotary belt support gear. Accordingly, the first gear meshes with the rotary belt support gear precisely, attaining stable transmission of the driving force from the first gear to the rotary belt support gear.

A configuration 4 shown in FIG. 10 is defined by the configuration 3 in which the belt support holder includes a rotary belt support holding portion (e.g., the heating roller holding portion 42d) that holds the rotary belt support and an opposed belt support holding portion (e.g., the fixing pad holding portion 42e) that holds the opposed belt support. The rotary belt support holding portion moves arcuately about the axis of the first gear. The opposed belt support holding portion moves linearly with respect to the rotary driver in the direction L in which the opposed belt support holding portion moves closer to and away from the rotary driver.

According to the configuration 4, the rotary belt support holding portion that moves arcuately about the axis of the first gear, even when the rotary belt support holding portion moves, retains the constant distance between the axis of the first gear and the axis of the rotary belt support gear. Accordingly, the first gear meshes with the rotary belt support gear precisely, attaining stable transmission of the driving force from the first gear to the rotary belt support gear. Conversely, the opposed belt support holding portion moves linearly with respect to the rotary driver in the direction L in which the opposed belt support holding portion moves closer to and away from the rotary driver, suppressing change in the position and the direction of the opposed belt support with respect to the rotary driver.

A configuration 5 shown in FIG. 10 is defined by the configuration 4 in which the belt device further includes an arcuate guide (e.g., the arcuate guide 41g) and a linear guide (e.g., the linear guide 41h). The arcuate guide guides the rotary belt support holding portion arcuately about the axis of the first gear. The linear guide guides the opposed belt support holding portion linearly in the direction L in which the opposed belt support holding portion moves closer to and away from the rotary driver. As shown in FIGS. 13A and 13B, the rotary belt support holding portion is assembled with the opposed belt support holding portion such that the rotary belt support holding portion is rotatable relative to the opposed belt support holding portion.

According to the configuration 5, the rotary belt support holding portion that is rotatable relative to the opposed belt support holding portion allows the rotary belt support holding portion and the opposed belt support holding portion to move on the different trajectories, respectively.

A configuration 6 shown in FIG. 15 is defined by the configuration 2 in which the belt support holder (e.g., the belt support holder 42U) moves linearly in the direction D in which the belt support holder moves closer to and away from the rotary driver. The rotary belt support mounts the rotary belt support gear at the one lateral end of the rotary belt support in the axial direction thereof. The rotary belt support gear meshes with the first gear that meshes with a second gear (e.g., the second gear 33) so that the driving force is transmitted to the rotary belt support through the second gear, the first gear, and the rotary belt support gear. The first gear moves arcuately about an axis of the second gear in accordance with motion of the belt support holder.

According to the configuration 6, since the first gear moves arcuately about the axis of the second gear, a distance between the axis of the first gear and the axis of the second gear is constant, retaining precise mesh between the first gear and the second gear. Further, the first gear that moves in accordance with motion of the belt support holder retains mesh with the rotary belt support gear. Accordingly, the first gear meshes with the rotary belt support gear precisely, attaining stable transmission of the driving force from the first gear to the rotary belt support gear.

A configuration 7 shown in FIG. 15 is defined by the configuration 6 in which the belt device further includes a biasing member (e.g., the pressure spring 53) that biases the first gear against the rotary belt support gear.

According to the configuration 7, a bias from the biasing member retains precise mesh between the first gear and the rotary belt support gear.

A configuration 8 shown in FIG. 17 is defined by the configuration 6 in which a following relation is satisfied:

$$-90°-\alpha \le \theta \le 90°-\alpha$$

where θ represents an angle defined by the linear line Q1 defined by the axis of the rotary belt support gear and the axis of the first gear and the linear line Q2 defined by the axis of the first gear and the axis of the second gear in the rotation direction D32 of the first gear; α represents a pressure angle of the driving force transmitted from the first gear to the rotary belt support gear.

According to the configuration 8, the angle θ and the pressure angle α that satisfy the above relation generate a bias that biases the first gear against the rotary belt support gear as the driving force is transmitted to the rotary belt support gear. Accordingly, the bias retains precise mesh between the first gear and the rotary belt support gear.

A configuration 9 shown in FIG. 15 is defined by any one of the configurations 6 to 8 in which the belt device further includes a gear holder (e.g., the gear holder 52) that holds the first gear and has a first restrictor (e.g., the restrictor 52a). The belt support holder (e.g., the belt support holder 42U) includes a second restrictor (e.g., the restrictor 42j) that contacts the first restrictor to restrict motion of the first gear that moves closer to the rotary belt support gear so as to retain the constant distance between the axis of the rotary belt support gear and the axis of the first gear.

According to the configuration 9, the first restrictor and the second restrictor restrict motion of the first gear that moves closer to the rotary belt support gear, retaining the constant distance between the axis of the rotary belt support gear and the axis of the first gear. Accordingly, the first gear meshes with the rotary belt support gear precisely, attaining stable transmission of the driving force from the first gear to the rotary belt support gear.

A configuration 10 shown in FIG. 7 is defined by any one of the configurations 1 to 9 in which a fixing device (e.g., the fixing devices 7, 7S, 7T, 7U, and 7V) includes a temperature detector (e.g., the thermistor 48 and the thermostat 49) disposed opposite at least one of the belt and the rotary belt support to detect the temperature of the at least one of the belt and the rotary belt support and a temperature detector holder (e.g., the temperature detector holder 50) that holds the temperature detector. As shown in FIG. 9, the biasing assembly presses the temperature detector holder against the belt support holder to move the temperature detector holder together with the belt support holder while retaining an interval between the temperature detector and the rotary belt support.

According to the configuration 10, the temperature detector holder moving together with the belt support holder retains a constant distance between the temperature detector and the rotary belt support. Accordingly, the temperature detector holder prevents degradation in accuracy in detecting the temperature of a temperature detection object (e.g., the fixing belt 20 and the heating roller 23) which may occur as the distance between the temperature detector and the temperature detection object changes, attaining precise temperature detection by the temperature detector.

A configuration 11 shown in FIGS. 2 and 8 is defined by the configuration 10 in which the fixing device incorporating the belt device includes a heater (e.g., the halogen heater 24) to heat the belt through the rotary belt support. As shown in FIG. 8, the temperature detector holder includes a heater holding portion (e.g., the heater holding portion 50e) that holds the heater.

According to the configuration 11, the temperature detector holder that holds the heater allows the heater to move together with the temperature detector holder as the temperature detector holder moves together with the belt support holder. Accordingly, the heater retains a positional relation with the rotary belt support, the opposed belt support, and the belt and therefore is immune from accidental contact with the rotary belt support, the opposed belt support, and the belt.

A configuration 12 shown in FIG. 3 is defined by any one of the configurations 1 to 11 in which the belt support holder includes a biasing assembly side end (e.g., the pressure lever side end 42m) that is opposite a rotary driver side end (e.g., the pressure roller side end 42n) disposed opposite the rotary driver and is pressed by the biasing assembly toward the rotary driver. The belt support holder further includes a rotary belt support holding through-hole (e.g., the heating roller holding through-hole 42b) having the length E1 in a pressurization direction of the biasing assembly. The rotary belt support includes an axial end (e.g., the axial end 23a) disposed at one lateral end of the rotary belt support in the axial direction thereof and rotatably inserted into the rotary belt support holding through-hole. The length E1 of the rotary belt support holding through-hole is greater than the length E2 of the axial end of the rotary belt support in the pressurization direction of the biasing assembly.

According to the configuration 12, even if the rotary belt support holding through-hole, since it has the length E1 defined above, is deformed as the belt support holder receives pressure from the biasing assembly, the rotary belt support holding through-hole retains smooth rotation of the rotary belt support, preventing increase of the rotation torque of the rotary belt support.

A configuration 13 is defined by any one of the configurations 1 to 12 in which the belt support holder is disposed at each lateral end of the rotary belt support in the axial direction thereof. Each belt support holder is constructed of identical parts.

Each belt support holder constructed of the identical parts reduces variation in a positional relation between the rotary belt support and the opposed belt support at one lateral end and another lateral end of the belt in the axial direction thereof. Accordingly, the belt support holder suppresses variation in tension exerted to the belt that results from variation in the positional relation between the rotary belt support and the opposed belt support in the axial direction of the belt, thus suppressing skew of the belt.

A configuration 14 shown in FIG. 2 is defined by any one of the configurations 1 to 13 in which the belt device is incorporated in the fixing device (e.g., the fixing devices 7, 7S, 7T, 7U, and 7V) that fixes the toner image T on the sheet P serving as a recording medium as the sheet P bearing the toner image T is conveyed through the fixing nip N formed between the belt and the rotary driver.

A configuration 15 shown in FIG. 1 is defined by an image forming apparatus (e.g., the image forming apparatus 1) that includes the fixing device according to the configuration 14.

According to the exemplary embodiments described above, the fixing belt 20 serves as an endless belt. Alternatively, a fixing film, a fixing sleeve, or the like may be used as an endless belt. Further, the pressure roller 21 serves as a rotary driver. Alternatively, a pressure belt or the like may be used as a rotary driver.

The present disclosure has been described above with reference to specific exemplary embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative exemplary embodiments may be combined with each other and/or substituted for each other within the scope of the present disclosure.

What is claimed is:

1. A belt device comprising:
an endless belt;
a rotary driver contacting an outer circumferential surface of the belt to drive and rotate the belt;
an opposed belt support disposed opposite the rotary driver and in contact with an inner circumferential surface of the belt;
a rotary belt support disposed opposite the rotary driver via the opposed belt support and in contact with the inner circumferential surface of the belt;
a belt support holder to hold the opposed belt support and the rotary belt support to retain a predetermined interval between the opposed belt support and the rotary belt support;
a biasing assembly to press against the belt support holder to move the opposed belt support and the rotary belt support collectively with respect to the rotary driver and bias the opposed belt support against the rotary driver;
a rotary belt support gear mounted on one lateral end of the rotary belt support in an axial direction thereof to transmit a driving force to the rotary belt support,
wherein the belt support holder receives a bias generated at the one lateral end of the rotary belt support in the axial direction thereof by the driving force,
the belt device further comprising:
a first gear to mesh with the rotary belt support gear to transmit the driving force to the rotary belt support gear; and
a second gear to mesh with the first gear to transmit the driving force to the first gear,
wherein the belt support holder moves linearly with respect to the rotary driver, and
wherein the first gear moves arcuately about an axis of the second gear in accordance with motion of the belt support holder,
the belt device further comprising a first restrictor connected to the first gear,
wherein the belt support holder includes a second restrictor contacting the first restrictor to restrict motion of the first gear that moves toward the rotary belt support gear so as to retain a constant distance between an axis of the rotary belt support gear and an axis of the first gear.

2. The belt device according to claim 1, further comprising a tension applicator to exert tension to the belt.

3. The belt device according to claim 1, further comprising a biasing member to bias the first gear against the rotary belt support gear.

4. The belt device according to claim 1, wherein a following relation is satisfied:

$$-90°-\alpha \leq \theta \leq 90°-\alpha$$

where $\theta$ represents an angle defined by a linear line defined by an axis of the rotary belt support gear and an axis of the first gear and a linear line defined by the axis of the first gear and the axis of the second gear in a rotation direction of the first gear and $\alpha$ represents a pressure angle of the driving force transmitted from the first gear to the rotary belt support gear.

5. The belt device according to claim 1, further comprising a gear holder, provided with the first restrictor, to hold the first gear.

6. The belt device according to claim 1, wherein the belt support holder is disposed at each lateral end of the rotary belt support in an axial direction thereof.

7. The belt device according to claim 6,
wherein the belt support holder includes:
a rotary driver side end disposed opposite the rotary driver;
a biasing assembly side end that is opposite the rotary driver side end and pressed by the biasing assembly toward the rotary driver; and
a rotary belt support holding through-hole having a length in a pressurization direction of the biasing assembly,
wherein the rotary belt support includes an axial end disposed at each lateral end of the rotary belt support in the axial direction thereof and rotatably inserted into the rotary belt support holding through-hole, and
wherein the length of the rotary belt support holding through-hole is greater than a length of the axial end of the rotary belt support in the pressurization direction of the biasing assembly.

8. The belt device according to claim 7, further comprising an opposed belt support holder to hold the opposed belt support,
wherein the belt support holder further includes an opposed belt support holding through-hole into which the opposed belt support holder is inserted.

9. A fixing device comprising the belt device of claim 1.

10. An image forming apparatus comprising the fixing device of claim 9.

11. A fixing device comprising:
an endless belt;
a heater to heat the belt;
a rotary driver contacting an outer circumferential surface of the belt to drive and rotate the belt;
an opposed belt support disposed opposite the rotary driver and in contact with an inner circumferential surface of the belt;
a rotary belt support disposed opposite the rotary driver via the opposed belt support and in contact with the inner circumferential surface of the belt;
a belt support holder to hold the opposed belt support and the rotary belt support to retain a predetermined interval between the opposed belt support and the rotary belt support;
a biasing assembly to press against the belt support holder to move the opposed belt support and the rotary belt support collectively with respect to the rotary driver and bias the opposed belt support against the rotary driver;
a temperature detector disposed opposite at least one of the belt and the rotary belt support to detect a temperature of the at least one of the belt and the rotary belt support; and
a temperature detector holder to hold the temperature detector,
wherein the biasing assembly presses the temperature detector holder against the belt support holder to move the temperature detector holder together with the belt support holder while retaining an interval between the temperature detector and the rotary belt support.

12. The fixing device according to claim 11, wherein the temperature detector holder includes a heater holding portion to hold the heater.

13. An image forming apparatus comprising:
an image forming device to form a toner image; and
a fixing device disposed downstream from the image forming device in a recording medium conveyance direction to fix the toner image on a recording medium,
the fixing device including:
an endless belt;
a heater to heat the belt;
a rotary driver contacting an outer circumferential surface of the belt to drive and rotate the belt;
an opposed belt support disposed opposite the rotary driver and in contact with an inner circumferential surface of the belt;
a rotary belt support disposed opposite the rotary driver via the opposed belt support and in contact with the inner circumferential surface of the belt;
a belt support holder to hold the opposed belt support and the rotary belt support to retain a predetermined interval between the opposed belt support and the rotary belt support;
a biasing assembly to press against the belt support holder to move the opposed belt support and the rotary belt support collectively with respect to the rotary driver and bias the opposed belt support against the rotary driver;
a temperature detector disposed opposite at least one of the belt and the rotary belt support to detect a temperature of the at least one of the belt and the rotary belt support; and
a temperature detector holder to hold the temperature detector,
wherein the biasing assembly presses the temperature detector holder against the belt support holder to move the temperature detector holder together with the belt support holder while retaining an interval between the temperature detector and the rotary belt support.

* * * * *